United States Patent
Kazuno et al.

(10) Patent No.: US 8,993,184 B2
(45) Date of Patent: Mar. 31, 2015

(54) FUEL CELL SYSTEM

(75) Inventors: Shuichi Kazuno, Saitama (JP); Hibiki Saeki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/409,757

(22) Filed: Mar. 1, 2012

(65) Prior Publication Data

US 2012/0225329 A1  Sep. 6, 2012

(30) Foreign Application Priority Data

Mar. 4, 2011  (JP) ................. 2011-047470

(51) Int. Cl.
  *H01M 8/04* (2006.01)
  *B60L 11/18* (2006.01)

(52) U.S. Cl.
  CPC ....... *B60L 11/1881* (2013.01); *H01M 8/04873* (2013.01); *H01M 8/04604* (2013.01); *H01M 8/04753* (2013.01); *H01M 8/04768* (2013.01); *H01M 2250/20* (2013.01); *Y02E 60/50* (2013.01); *Y02T 90/32* (2013.01); *Y02T 90/34* (2013.01)
  USPC ........... 429/432; 429/430; 429/428; 429/444; 429/443

(58) Field of Classification Search
  None
  See application file for complete search history.

(56) References Cited

U.S. PATENT DOCUMENTS

| 2005/0260483 | A1 | 11/2005 | Cho | |
|---|---|---|---|---|
| 2007/0202386 | A1 | 8/2007 | Matsuoka et al. | |
| 2010/0068576 | A1* | 3/2010 | Hamada et al. | 429/23 |

FOREIGN PATENT DOCUMENTS

| CN | 101558524 A | 10/2009 |
|---|---|---|
| CN | 101569044 A | 10/2009 |
| CN | 101593993 A | 12/2009 |
| DE | 103 94 013 T5 | 12/2005 |
| DE | 11 2006 001 469 T5 | 4/2008 |
| JP | 60-177565 A | 9/1985 |
| JP | 2005-93111 A | 4/2005 |
| JP | 2005-158662 A | 6/2005 |
| JP | 2007-5038 A | 1/2007 |
| JP | 2007-258117 A | 10/2007 |
| WO | WO 2008146928 A1 * | 12/2008 |

OTHER PUBLICATIONS

Japanese Office Action dated Jan. 29, 2013, issued in corresponding Japanese Patent Application No. 2011-047470.
German Search Report dated Nov. 27, 2012, issued in corresponding German patent application No. 10 2012 203 344.0.
German Examination Report dated Nov. 28, 2012, issued in corresponding German patent application No. 10 2012 203 344.0.
Office Action dated Jan. 6, 2014, issued in corresponding Chinese application No. 201210046644.5.

* cited by examiner

*Primary Examiner* — Carlos Barcena
*Assistant Examiner* — Wojciech Haske
(74) *Attorney, Agent, or Firm* — Westerman, Hattori, Daniels & Adrian, LLP

(57) ABSTRACT

A fuel cell system is provided that includes a fuel cell stack, an air pump, a first convertor, a motor, and an ECU for controlling the air pump and the first convertor based on the target voltage and the switching voltage of the single cell. The ECU executes the first mode such that the actual voltage of the single cell corresponds to the target voltage, when the target voltage is equal to or less than the switching voltage, while the ECU executes the second mode such that the actual voltage of the single cell is kept at the switching voltage, when the target voltage is more than the switching voltage. Further, the ECU executes the second mode thereby to change the actual current of the single cell.

11 Claims, 14 Drawing Sheets

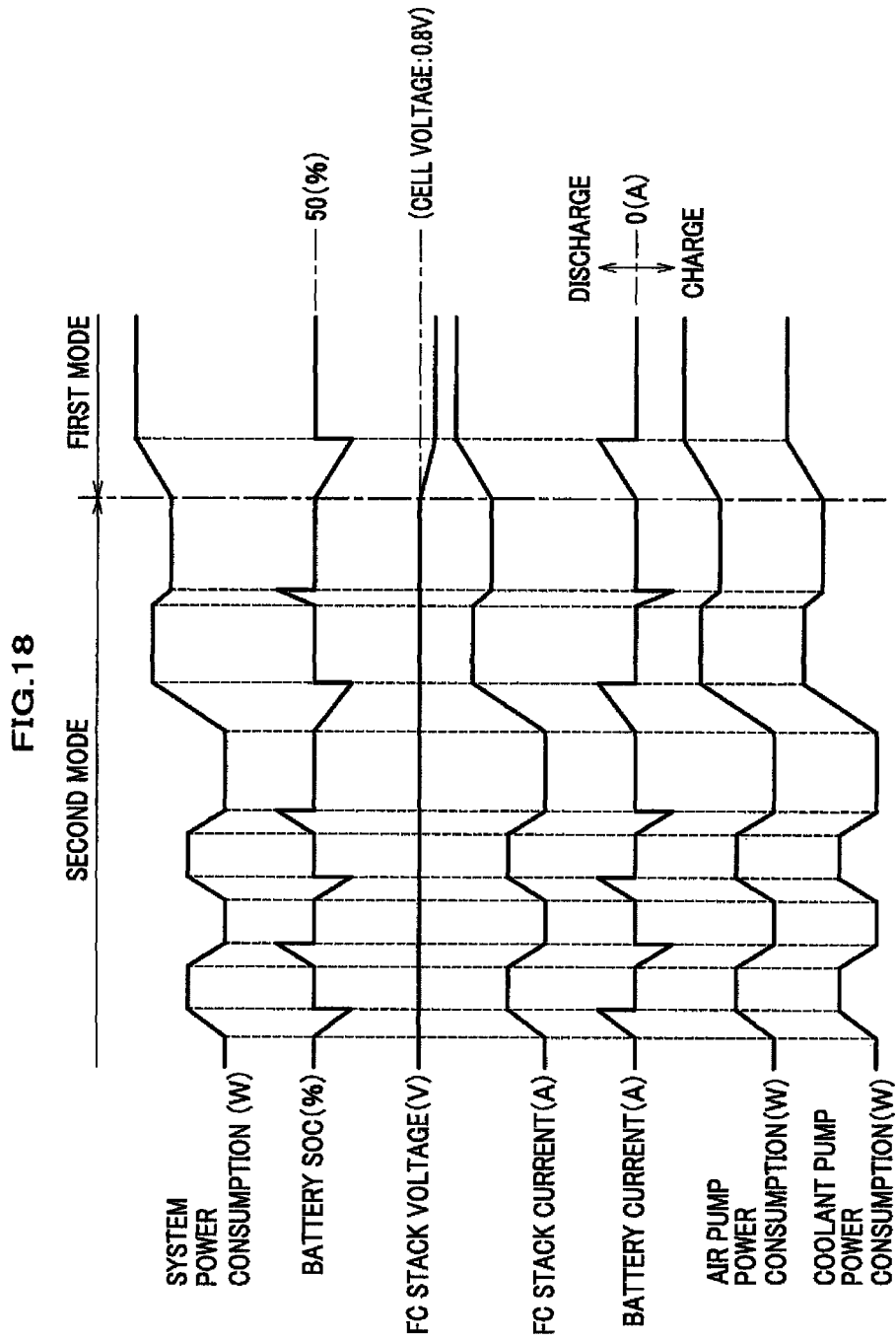

US 8,993,184 B2

FUEL CELL SYSTEM

CROSS REFERENCE TO RELATED APPLICATIONS

This application claims the foreign priority benefit under Title 35, United State Code, 119 (a)-(d) of Japanese Patent Application No. 2011-047470, filed on Mar. 4, 2011 in the Japan Patent Office, the disclosure of which is herein incorporated by reference in its entirety.

BACKGROUND OF THE INVENTION

1. Field of the Invention

The present invention relates to a fuel cell system.

2. Description of Related Art

Conventionally, techniques for generating electric power by a fuel cell stack along with avoiding damage of a catalyst in a fuel cell have been proposed, through preventing a cell voltage from coming in the range of the oxidation-reduction proceeding potential of the catalyst. Such techniques have been developed as an approach of improving the durability of a fuel cell stack used in a fuel cell vehicle or the like (referred to Japanese Laid-Open Patent Publication No. 2007-5038).

However, according to Japanese Laid-Open Patent Publication No. 2007-5038, it is needed to increase or decrease the electric power outputted from the fuel cell stack with respect to the required electric power demanded by a power consuming load such as a traveling motor or the like, in order to set the cell voltage out of the voltage range with the oxidation-reduction potential of the catalyst. In such a case, the excess electric power is charged in a battery (or electricity storage device), while the electric power in deficiency is assisted (or supplied) by the battery.

Accordingly, the frequency of the charge/discharge processes becomes too many in order to continuously prevent the cell voltage from being set into the range with the oxidation-reduction potential of the catalyst. As mentioned above, the too many frequencies of the charge/discharge processes of the battery cause electric energy loss associated with the charge/discharge processes, resulting in the decrease in the vehicle efficiency (for example, undesirably large fuel expenses).

SUMMARY OF THE INVENTION

The present invention is accomplished in view of the foregoing drawbacks. An object of the present invention is to provide a fuel cell system for having the fuel cell generate electric power corresponding to a requirement of a power consuming load, along with improving the durability of the fuel cell.

In order to solve the aforementioned drawbacks, a fuel cell system of the present invention comprises: a fuel cell having a catalyst so as to generate electric power via promoting the reaction of oxygen or hydrogen by using the catalyst; a gas supply unit for supplying at least either of oxygen and hydrogen to the fuel cell; a coolant supply unit for supplying a coolant to the fuel cell; a voltage control unit for controlling a voltage outputted from the fuel cell; a power consuming load driven by the electric power outputted from the fuel cell; a control unit for controlling the gas supply unit, the coolant supply unit and the voltage control unit.

Herein, the control unit controls the gas supply unit such that at least either of the concentrations of the above mentioned oxygen and hydrogen supplied to the fuel cell corresponds to the required electric power demanded by the power consuming load, with keeping the state that the actual voltage of the fuel cell is set to the predetermined voltage that is out of the voltage range for promoting the oxidation-reduction reaction of the catalyst through controlling the voltage control unit. Simultaneously, the control unit supplies the coolant into the fuel cell using the coolant supply unit.

Here, the fuel cell has characteristics that the larger the outputted actual current increases, the smaller the outputted actual voltage decreases, in accordance with the IV characteristics of the fuel cell (see the IV curve in FIG. 15).

Further, when the required electric power demanded by the power consuming load increases, the actual current is generally to be increased so as to increase the actual electric power outputted from the fuel cell. Hereby, when the actual voltage is small and the actual current is large (that is, in the case that the target voltage is equal to or less than the switching voltage), the fuel cell corresponds to a high power consuming load that the required electric power is large. In contrast, when the actual voltage is large and the actual current is small (that is, in the case that the target voltage is more than the switching voltage), the fuel cell corresponds to a small power consuming load that the required electric power is low.

The above mentioned construction allows the actual voltage of the fuel cell to be set at the predetermined voltage that is out of the voltage range promoting the oxidation-reduction reaction of the catalyst through controlling the voltage control unit by the control unit. Herein, the predetermined voltage is set out of the voltage range for promoting the oxidation-reduction reaction of the catalyst, allowing the actual voltage to be kept at the predetermined voltage. This prevents the oxidation reaction and the reduction reaction of the catalyst from being frequently repeated, which may suppress the elution or the like of the catalyst thereby to prevent the deterioration of the fuel cell. Accordingly, the durability of the fuel cell may be improved.

Further, the control unit controls the gas supply unit so that at least either of the oxygen and hydrogen concentrations supplied to the fuel cell corresponds to the required electric power demanded by the power consuming load. Herein, by changing at least either of the oxygen and hydrogen concentrations, the IV characteristics of the fuel cell also changes. As mentioned above, the change in at least either of the concentrations of oxygen and hydrogen supplied to the fuel cell, conducted in order to correspond to the required electric power demanded by the power consuming load, allows the actual current of the fuel cell to be also changed, whereby the actual electric power outputted from the fuel cell corresponds to the required electric power.

As mentioned hereinbefore, the fuel cell generates the electric power in just proportions corresponding to the required electric power demanded by the power consuming load, which may prevent the generation of shortage power and excess power, the necessity of charge/discharge processes of an electricity storage device, and the generation of an energy loss such as a thermal loss caused following the charge/discharge process. Accordingly, the efficiency such as an energy balance of the fuel cell system may be improved.

Furthermore, as mentioned above, the control unit fixes the actual voltage of the fuel cell at the predetermined voltage, and supplies a coolant to the fuel cell using the coolant supply unit, along with modifying at least either of the oxygen and hydrogen concentrations. This allows the temperature of the fuel cell to be appropriately kept.

Further, in the fuel cell system, the control unit controls the gas supply unit and the voltage control unit based on the target voltage of the fuel cell, calculated by the required electric power and the switching voltage which is not more than the voltage for promoting the oxidation-reduction reaction of the catalyst. Herein, when the target voltage is not more than the switching voltage, the control unit executes a first mode for controlling the voltage control unit so that the actual voltage of the fuel cell corresponds to the target voltage.

In contrast, when the target voltage is more than the switching voltage, the control unit preferably executes a second mode for having the actual voltage outputted from the fuel cell correspond to the required electric power, by controlling the voltage control unit such that the actual voltage of the fuel cell is fixed at the switching voltage, together with, by changing the IV characteristics of the fuel cell through controlling the gas supply unit to modify at least either of the oxygen and hydrogen concentrations thereby to change the actual current of the fuel cell.

Note preferably the switching voltage is set at not more than the voltage for promoting the oxidation-reduction reaction of the catalyst, and not less than the aforementioned predetermined voltage. Further, an embodiment described hereinafter will explain an example that the switching voltage is equal to the predetermined voltage.

According to above mentioned construction, the control unit executes the first mode for controlling the voltage control unit so as to have the actual voltage of the fuel cell correspond to the target voltage, when the target voltage is equal to or less than the switching voltage (or in the case of a high power consuming load). In other words, the control unit executes the first mode comprising the steps of: supplying at least either of oxygen and hydrogen in just proportions using the gas supply unit, having the actual voltage of the fuel cell correspond to the target voltage using the voltage control unit, and changing the actual voltage of the fuel cell in accordance with the IV characteristics of the fuel cell under the gas supplying conditions. For example, when the actual voltage is made smaller, the actual current becomes larger.

As mentioned hereinbefore, by having the actual voltage correspond to the target voltage, the actual current also changes, whereby the actual electric power outputted from the fuel cell may correspond to the required electric power demanded by the power consuming load. That is, the power generation of the fuel cell in just proportions corresponding to the required electric power demanded by the power consuming load, allows no shortage power or excess power to be generated, no charge/discharge of the electricity storage device to be necessary, and no energy loss such as a thermal loss corresponding to the charge/discharge process to be caused. Therefore, the efficiency of the fuel cell system (or energy balance) may be improved.

In contrast, when the target voltage is more than the switching voltage (or in the case of low power consuming load), the control unit executes the second mode.

For example, the control unit controls the voltage control unit, thereby to fix the actual voltage of the fuel cell at the switching voltage (in an embodiment described hereinafter, the voltage is 0.8V). Herein, the switching voltage is equal to or less than the voltage range for promoting the oxidation-reduction reaction of the catalyst. Thus, the fixing (or keeping) of the actual voltage at the switching voltage, prevents the frequently repeated oxidation reaction and reduction reaction of the catalyst in the same period. This allows the elution or the like of the catalyst to be suppressed, which results in the prevention of deteriorating the fuel cell. Accordingly, the durability of the fuel cell may be improved.

Together with this, the control unit controls the gas supply unit to modify at least either of the reaction gas concentrations (or oxygen and hydrogen concentrations), thereby to change the IV characteristics of the fuel cell, which allows the accurate current of the fuel cell to be changed. Hereby, this may have the accurate electric power outputted from the fuel cell correspond to the required electric power.

As mentioned above, the fuel cell generates electric power in just proportions by corresponding to the required electric power demanded by the power consuming load. This enables no shortage and excess power to be generated, no charge/discharge of an electricity storage device to be necessary, and no energy loss (or no thermal loss) following the charge/discharge process to be caused. Therefore, the efficiency of the fuel cell system (or energy balance) may be improved.

Moreover, preferably the switching voltage is set based on the IV property of the fuel cell which normally generates electric power such that abundant amounts of the reaction gases circulate in the fuel cell system.

The above mentioned construction allows the output (or actual electric power) of the fuel cell in the first mode (or in the case of a high power consuming load) to be well maintained. Further, the change in the supply amounts of the reaction gases in the second mode (or in the case of a low power consuming load) may be kept in the lowest limits.

Furthermore, the fuel cell system preferably comprises an electricity storage unit for storing the electric power generated by the fuel cell.

The above mentioned construction allows the electricity storage unit to charge the excess electric power and to supply the electric power to a device in shortage of the power, even though response delay (or control delay) occurs in the system to cause a state of the excess/shortage electric power in the fuel cell.

Further, in the fuel cell system, preferably the control unit calculates the required electric power based on the stored volume in the electricity storage unit such that the electricity storage unit stores the target storage volume.

The above mentioned construction allows the control unit to calculate required electric power based on the stored volume in the electricity storage unit such that the electricity storage unit stores the target storage volume (for example, in an embodiment described hereinafter; SOC=50%).

This enables the fuel cell to generate the electric power as the actual electric power (or actual voltage and actual current), taking the target storage volume in the electricity storage unit into account. Accordingly, the electricity storage unit may charge/discharge so as to store the target storage volume, allowing the storage volume in the electricity storage unit to be preferably maintained.

Further, in the fuel cell system, preferably the control unit fixes the actual voltage of the fuel cell at the predetermined voltage. Together with this, preferably the control unit controls the coolant supply unit such that the supply amount of the coolant into the fuel cell corresponds to the required electric power while the control unit is having at least either of the reaction gas concentrations correspond to the required electric power demanded by the power consuming load.

The above mentioned construction enables the control unit to fix the actual voltage of the fuel cell at the predetermined voltage, and to control the coolant supply unit such that the supply amount of the coolant to the fuel cell corresponds to the required electric power while the control unit is having at least either of the reaction gas concentrations correspond to the required electric power demanded by the power consuming load. This allows the temperature of the fuel cell to be kept in an efficient and appropriate manner.

Moreover, preferably the fuel cell system further comprises a power generation stability judgment unit that judges whether or not the fuel cell stably generates the electric power. Herein, if the power generation stability judgment unit judges that the fuel cell does not stably generate the electric power, preferably the control unit may control the gas supply unit so as to increase at least either of the reaction gas concentrations.

In the above mentioned construction, if the power generation stability judgment unit judges that the fuel cell does not stably generate the electric power, the control unit controls the gas supply unit so as to increase at least either of the reaction gas concentrations. Thus, the increase in at least either of the reaction gas concentrations may facilitate the fuel cell to stably generate the electric power.

Moreover, the fuel cell system further comprises a junction passage that joins at least either of the off-gases discharged from the fuel cell to at least either of the reaction gases flowing toward the fuel cell. The gas supply unit further comprises an off-gas flow rate control unit that is provided with the junction passage so as to control the flow rate of the off-gas to be joined. Herein, if the power generation stability judgment unit judges that the fuel cell does not stably generate the electric power, preferably the off-gas flow rate control unit may increase the flow rate of the off-gas.

Here, if at least either of the off-gases contains hydrogen, the junction passage joins the hydrogen off-gas discharged from the fuel cell (in an embodiment described hereinafter, referred to an anode off-gas) to hydrogen flowing toward the fuel cell.

In contrast, if at least either of the off-gases contains oxygen, the control unit joins the oxygen off-gas discharged from the fuel cell (in an embodiment described hereinafter, referred to a cathode off-gas) to oxygen flowing toward the fuel cell.

According to the above mentioned construction, if the power generation stability judgment unit judges that the fuel cell does not stably generate the electric power, the off-gas flow rate control unit increases the flow rate of the off-gas. This makes a volume flow rate of a mixed gas (that is, a mixed gas composed of at least either of oxygen and hydrogen, and either of the off-gases) flowing toward the fuel cell increase, thereby to disperse at least either of oxygen and hydrogen in the mixed gas. This facilitates the mixed gas, in which at least either of oxygen and hydrogen is dispersed to increase the volume flow rate thereof, to be supplied to the whole fuel cell, leading to the efficient result that the fuel cell recovers the power generation stability.

Here, as mentioned hereinafter, particularly if the fuel cell is a fuel cell stack formed by stacking a plurality of the single cells and configured to supply oxygen/hydrogen to each single cell in parallel, the supply of the mixed gas of which volume flow rate is increased, facilitates oxygen/hydrogen to be uniformly supplied to every single cell, resulting in the stable power generation by the fuel cell stack.

Further, in the fuel cell system, if the power generation stability judgment unit judges that the fuel cell does not stably generate the electric power, preferably the off-gas flow rate control unit increases the flow rate of the off-gas, and subsequently the control unit controls the gas supply unit so as to increase at least either of the concentrations of the fresh reaction gases introduced from the outside.

In above mentioned construction, if the power generation stability judgment unit judges that the fuel cell does not stably generate the electric power, the off-gas flow rate control unit increases the flow rate of the off-gas, and subsequently the control unit controls the gas supply unit such that at least either of the concentrations of the fresh reaction gases introduced from the outside is increased. Accordingly, this allows the volume flow rate of the mixed gas flowing toward the fuel cell (or mixed gas composed of at least either of oxygen and hydrogen, and either of the off-gasses) to be increased.

Hereby, the mixed gas is easily supplied to the whole fuel cell, allowing the stable power generation by the fuel cell to be efficiently recovered.

Here, in the fuel cell system, preferably the gas supply unit may further comprise an air pump that supplies air containing oxygen to the fuel cell.

The above mentioned construction allows the air pump to supply air containing oxygen to the fuel cell.

Here, in the fuel cell system, preferably the gas supply unit may further comprise a hydrogen pump that supplies hydrogen to the fuel cell.

The above mentioned construction allows the hydrogen pump to supply hydrogen to the fuel cell.

Further, in the fuel cell system, preferably the power consuming load may include a motor for driving a vehicle, the motor being equipped with the vehicle.

The above mentioned construction allows the motor for driving to drive (or make traveling of) the vehicle. Further, as mentioned hereinbefore, the high durability of the fuel cell together with the high efficiency of the fuel cell system lead to the increases in the durability and the efficiency of the vehicle.

According to the present invention, it is possible to provide a fuel cell system having the fuel cell generate electric power corresponding to a requirement of a power consuming load, along with increasing the durability of the fuel cell.

BRIEF DESCRIPTION OF THE DRAWINGS

FIG. 18 is a time chart showing an operational example of the fuel cell system in the present embodiment.

DETAILED DESCRIPTION OF THE PREFERRED EMBODIMENT

Hereinafter, an embodiment of the present invention will be described referring to the attached diagrams: FIG. 1 to FIG. 18.

Construction of Fuel Cell System

Figure 1:
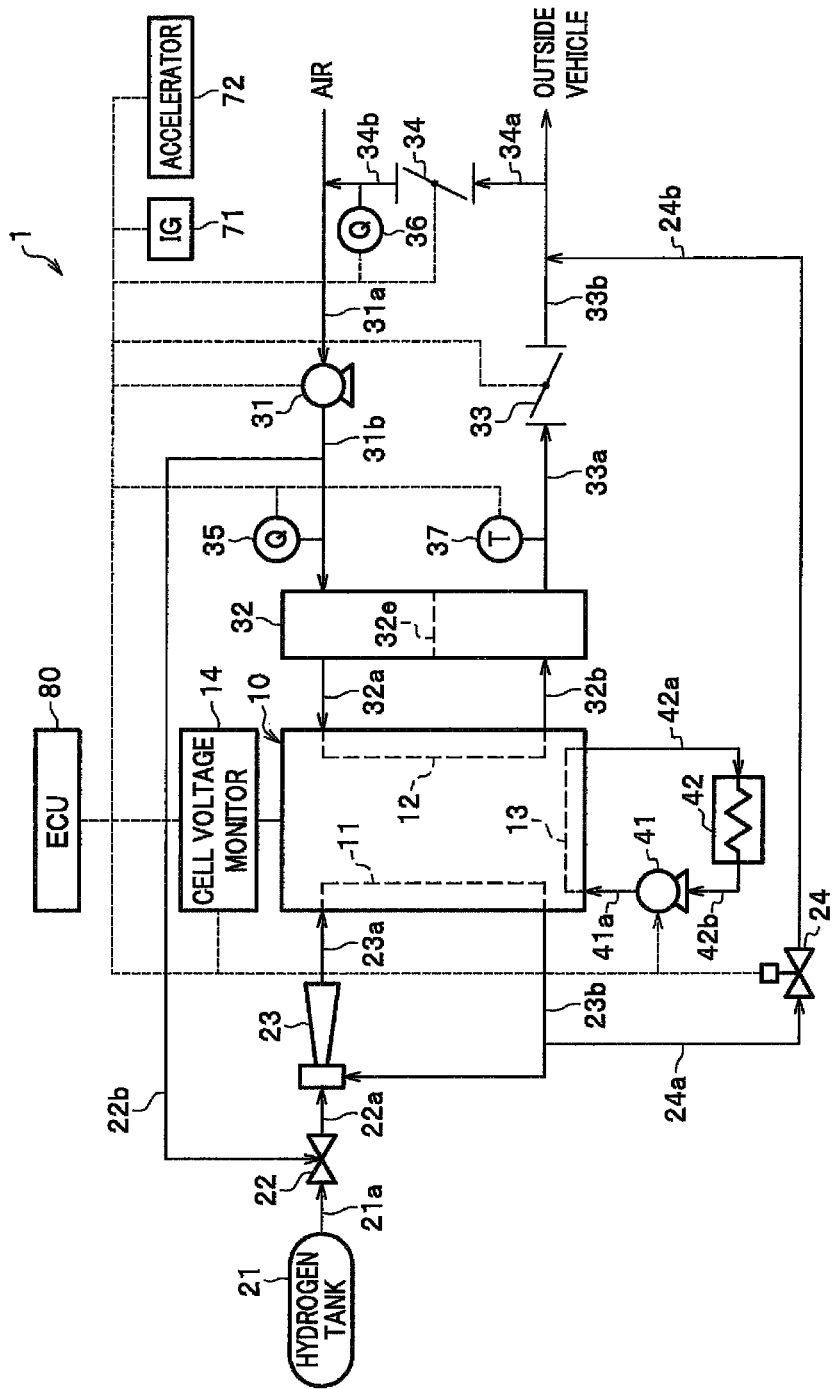
FIG. 1 is a diagram showing a schematic construction of the fuel cell system in the present embodiment.

A fuel cell system 1 of the present embodiment shown in FIG. 1 is mounted on a fuel cell vehicle (or moving body) not shown.

The fuel cell system 1 comprises a fuel cell stack 10 (or fuel cell), a cell voltage monitor 14, an anode system for supplying/discharging hydrogen (or fuel gas) to/from the anode in the fuel cell stack 10, a cathode system for supplying/discharging air containing oxygen (or oxidation gas) to/from the cathode in the fuel cell stack 10, a coolant system for circulating (or distributing) a coolant through the fuel cell stack 10, an electric power control system for controlling the power generation of the fuel cell stack 10; the electric power control system being connected with an output terminal (not shown) of the fuel cell system 10, and ECU 80 (Electronic Control Unit) operating as a control unit for electronically controlling the above mentioned devices and systems.

Herein, the fuel gas and the oxidation gas mentioned above are not limited to the specific types, and various types thereof may be applicable.

Fuel Cell Stack

The fuel cell stack 10 is configured as a stack of laminated solid polymer type single cells (or fuel cells), formed by stacking the plurality of the cells (for example, 200 to 600 sheets). The plurality of single cells are connected in series. Herein, a single cell comprises an MEA (Membrane Electrode Assembly), and two sheets of separators having electric conductivity; the separators putting the MEA therebetween. The MEA comprises an electrolyte membrane (or solid polymer film) made of a monovalent cation exchange membrane, an anode and a cathode (electrodes) which put the electrolyte membrane therebetween.

Each of the anode and the cathode comprises a porous material having electric conductivity such as carbon paper, and a catalyst such as Pt and Ru or the like, supported by the porous material and promoting the electrode reaction in the anode and the cathode.

In each separator, a groove for supplying hydrogen or air to the whole surface of each MEA and a through hole for supplying/discharging hydrogen or air to/from every single cell.

Such a groove and a through hole function as an anode passage 11 (or fuel gas passage) and a cathode passage 12 (or oxidation gas passage). Further, such an anode passage 11 and a cathode passage 12 branch to a plurality of passages and join together so as to particularly supply hydrogen and air to the whole surface of every single cell, resulting in a formation of the extremely small cross-sectional area of each passage.

Then, when hydrogen is supplied to each anode through the anode passage 11, the electrode reaction represented by an equation (1) occurs, while when air is supplied to each cathode through the cathode passage 12, the electrode reaction represented by an equation (2) occurs, whereby a potential difference (OCV: Open Circuit Voltage) is caused in each single cell. Subsequently, the fuel cell stack 10 sets to the electrical connection with a power consuming load such as a motor 51, which is described hereinafter. Then, when currents turn to be extracted from the fuel cell stack 10, the fuel cell stack 10 starts to generate electric power.

$$2H_2 \rightarrow 4H^+ + 4e^- \quad (1)$$

$$O_2 + 4H^+ + 4e^- \rightarrow 2H_2O \quad (2)$$

As mentioned above, when the fuel cell stack starts power generation, moisture (or water vapor) is generated on the cathode, and the humidity of the cathode off-gas discharged from the cathode passage 12 becomes high.

Further, in each separator, a groove and a through hole, which are used for circulating the coolant to cool each of the single cells, are formed to function as a coolant passage 13.

Meanwhile, in the fuel cell stack 10, the power generation at a low voltage and at a high voltage is repeatedly performed corresponding to the fluctuation of the required electric power demanded by the power consuming load such as a motor 51. Hereby, the oxidation reaction represented by an equation (3) and the reduction reaction represented by an equation (4) simultaneously and repeatedly proceed on the catalyst surfaces included in the anode and the cathode. Accordingly, this may induce elution of the catalyst and sintering phenomena (that is, agglomeration of the catalyst), resulting in the deterioration of the output performance of the fuel cell stack 10.

Note the equations (3) and (4) show the case that the catalyst is platinum (Pt).

$$Pt + 2H_2O \rightarrow Pt(OH)_2 + 2H^+ + 2e^- \quad (3)$$

$$Pt(OH)_2 + 2H^+ + 2e^- \rightarrow Pt + 2H_2O \quad (4)$$

Next, the case that the catalyst is platinum (Pt) will be explained in detail referring to FIGS. 3 and 4.

When abundant amounts of hydrogen and air (or oxygen) circulate in the fuel cell stack 10 to have the fuel cell stack 10 (or single cell) normally start electric power generation and generate the power based on the usual IV characteristics (see FIG. 15), in the voltage region where the cell potential (or cell voltage, voltage of single cell) is 0.8V or less, the reduction reaction of the equation (4) mainly proceeds so that a reduction current mainly circulates.

Figure 5:
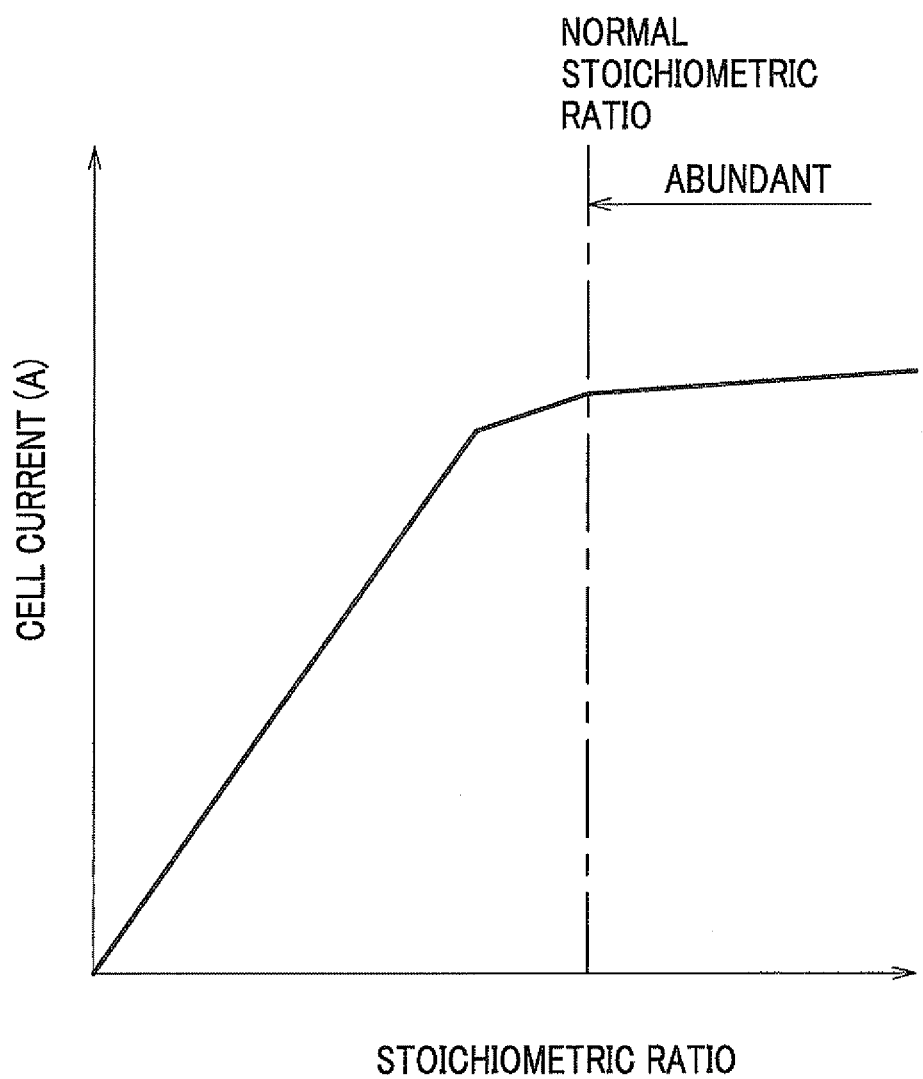
FIG. 5 is a graphic diagram showing the relationship between the stoichiometric ratio of oxygen and the cell current (or current of the single cell).

Herein, the term "an abundant amount of oxygen" means the amount of oxygen in the region beyond the usual stoichiometric ratio as shown in FIG. 5, where the cell current (or current outputted from the single cell) becomes substantially constant to turn into a saturated state, even though the stoichiometric ratio (or oxygen concentration) is made to be increased. Here, the term "an abundant amount of hydrogen" means the similar meaning to the above mentioned definition.

In the region where the cell potential is in the range from 0.8 to 0.9V, both the oxidation reaction in the equation (3) and the reduction reaction in the equation (4) proceed, and hereby both oxidation and reduction currents easily circulate. Here, it should be noted that the present inventors get the following findings. Namely, if the oxidation reaction in the equation (3) proceeds and simultaneously the reduction reaction in the equation (4) proceeds, in other words, if the oxidation reaction and the reduction reaction of platinum which progress simultaneously are frequently repeated, this results in elution of platinum thereby to promote the deterioration of the MEA (namely the degradation amount in FIG. 4 turns to be larger).

In the region where the cell potential is 0.9V or more, the oxidation reaction in the equation (3) mainly proceeds thereby to generally circulate an oxidation current.

Figure 3:
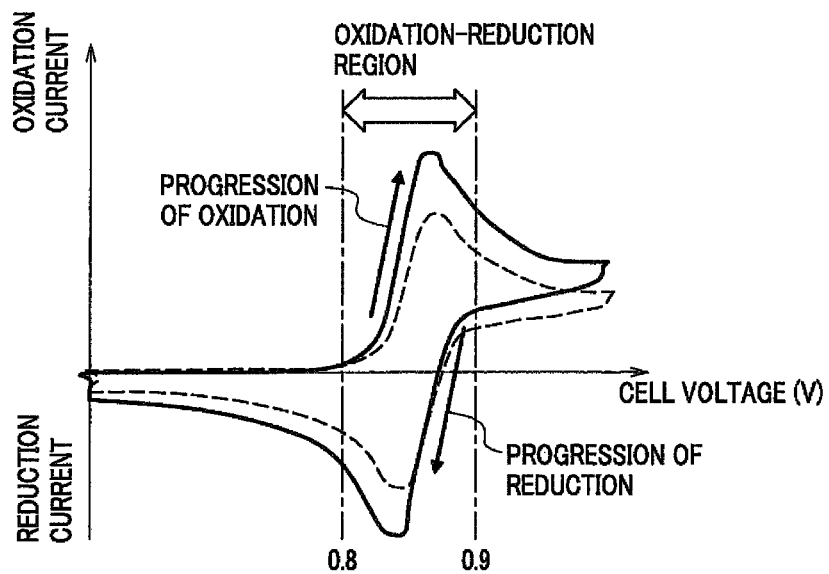
FIG. 3 is a diagram showing cyclic voltammetry of Pt (platinum).
Figure 4:
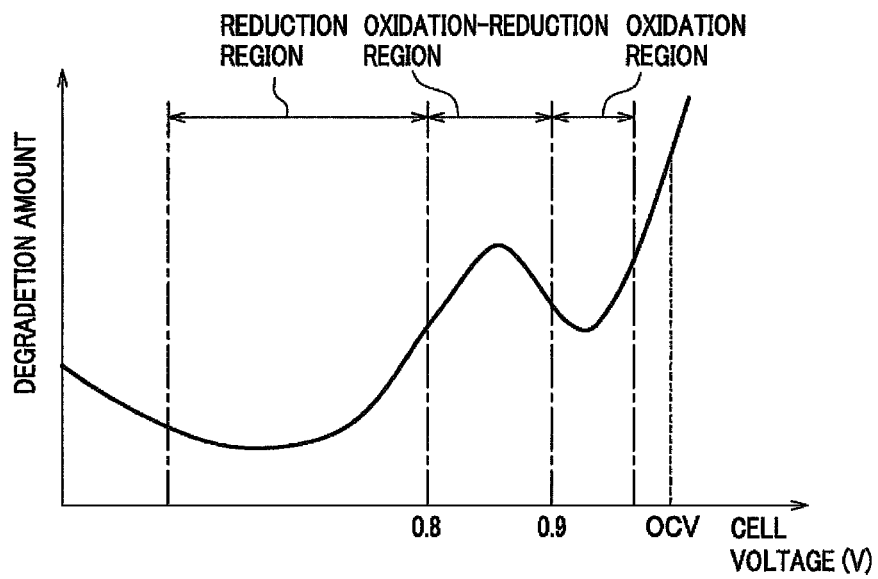
FIG. 4 is a graphic diagram showing the relationship between the cell potential (or cell voltage) and the deterioration amount of the single cell.

Note the oxidation current and the reduction current shown as a solid line in FIG. 3, shift as shown by a broken line, corresponding to the fluctuation speed (or, accelerating/decelerating by a fuel cell vehicle) of the cell potential (or cell voltage). Thus, preferably the oxidation current and the reduction current may be acquired corresponding to the fluctuation speed (or, accelerating/decelerating by a fuel cell vehicle) of the cell potential.

Figure 15:
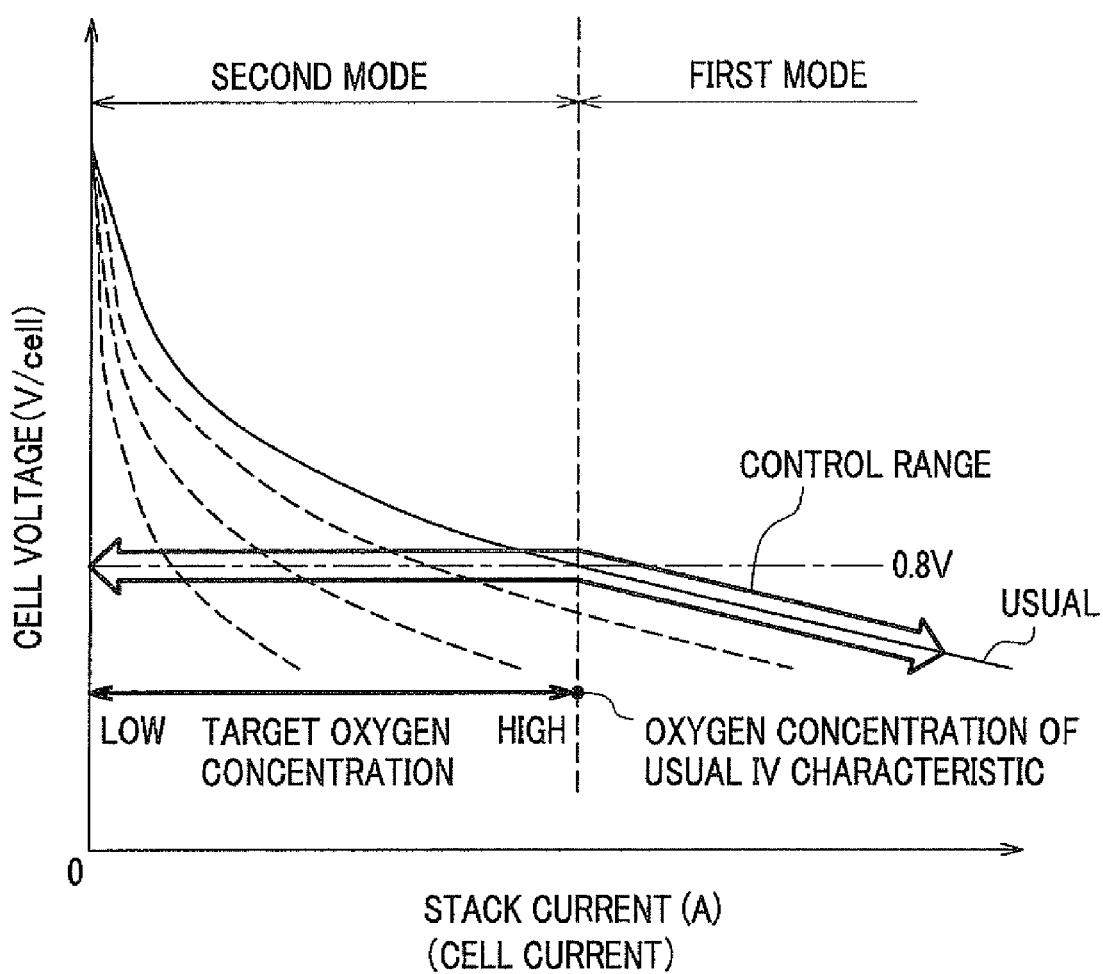
FIG. 15 is a mapping diagram showing the relationship between the current of the fuel cell stack (or single cell) and the voltage (or cell voltage) of the single cell.

In the meantime, the single cell (fuel cell stack 10) has the IV characteristics (or IV curve) shown in FIG. 15. Herein, the actual voltage (or cell voltage) becomes gradually smaller, as the actual current (or cell current) outputted from the single cell increases.

Accordingly, when the required electric power (or target electric power) from the motor 51 or the like becomes smaller, and the cell voltage becomes larger than 0.8V, both the oxidation reaction in the equation (3) and the reduction reaction in the equation (4) proceed, the oxidation reaction and the reduction reaction of platinum are frequently repeated in the same period. This may promote the deterioration of the single cell (or fuel cell stack 10).

Hereby, in the present embodiment, even if the required electric power becomes smaller, the power generation of the single cell (fuel cell stack 10) is made to correspond to the required electric power (or target electric power) by changing the IV characteristics through decreasing (or changing) the oxygen concentration, along with fixing the cell voltage at 0.8V (or switching voltage, predetermined voltage), thereby to decrease the actual current outputted from the single cell (or fuel cell stack 10) (referred to FIG. 15).

Further, the present embodiment is directed to the following advantageous features: the single cell (or fuel cell stack 10) is made to generate electric power in just proportions, the frequency of the charge/discharge processes of the high voltage battery 53 described hereinafter is made to be fewer, and the electric energy loss (for example, thermal loss) caused in association with the charge/discharge process is made to be less.

In other words, the present embodiment shows an example that the cell voltage is set to 0.8V, that is, "out of the range of the oxidation-reduction proceeding voltage (that is, 0.8V<reaction proceeding voltage<0.9V) at which voltage the oxygen and reduction reactions of platinum (Pt) proceed, and the switching voltage (or predetermined voltage) is set to equal to or smaller than the range of the oxidation-reduction proceeding voltage." Note the switching voltage and the predetermined voltage are not limited to 0.8V and various voltages may be applied.

Cell Voltage Monitor

Next, returning to FIG. 1, will be subsequently explained the present embodiment.

A cell voltage monitor 14 (or power generation detecting unit) is a device for detecting the cell voltage per each of a plurality of single cells composing the fuel cell stack 10. The cell voltage monitor 14 comprises a monitor body and a wire harness connecting the monitor body with each single cell. The monitor body scans all of the single cells in the predetermined period, detects the cell voltage of each single cell, and calculates an average cell voltage and a minimum cell voltage. Further, the monitor body (or cell voltage monitor 14) outputs the calculated data of the average cell voltage and the minimum cell voltage to the ECU 80.

Anode System

An anode system comprises a hydrogen tank 21 (or fuel gas supply unit, reaction gas supply unit), a regulator 22, an ejector 23, and a normal-close type of purge valve 24.

The hydrogen tank 21 is connected with an inlet of the anode passage 11 through a pipe 21a, the regulator 22, a pipe 22a, the ejector 23, and a pipe 23a. Then, hydrogen in the hydrogen tank 21 is supplied to the anode passage 11 through the pipe 21a or the like. Note the pipe 21a is equipped with a normal-close type of shut-off valve (not shown), which the ECU 80 opens while the fuel stack 10 is generating electric power.

The regulator 22 appropriately controls a hydrogen pressure at the secondary side thereof (or downstream side thereof). That is, the regulator 22 controls a pressure at the secondary side (or hydrogen pressure at the anode side) so as to balance the hydrogen pressure with the air pressure at the cathode side introduced through the pipe 22b as a pilot pressure. That is, the hydrogen pressure at the anode side is interlocked with the air pressure at the cathode side. Therefore, if the rotation number of the air pump 31 is modified to change the oxygen concentration as mentioned hereinafter, the hydrogen pressure at the anode side is also changed together.

The ejector 23 generates a lower pressure by jetting out the hydrogen through a nozzle, supplied from the hydrogen tank 21. The generated lower pressure sucks the anode off-gas in the pipe 23b.

The outlet of the anode passage 11 is connected to the inlet port of the ejector 23 through the pipe 23b. The anode off-gas discharged from the anode passage 11 flows toward the ejector 23 through the pipe 23b thereby to circulate the anode off-gas (or hydrogen).

Note the anode off-gas contains the hydrogen that has not been consumed by the electrode reaction in the anode, and the water vapor. Further, the pipe 23b is equipped with a gas-liquid separator (not shown) which separates/collects water ((or condensed water (liquid), water vapor (gas)) included in the anode off-gas.

A halfway portion of the pipe 23b is connected to a diluter (not shown) equipped with a pipe 33b described hereinafter through the pipe 24a, the purge valve 24 and the pipe 24b. When the power generation of the fuel cell stack 10 is determined as unstable, the purge valve 24 is made to be opened by the ECU 80 in the predetermined valve-open period. Herein, the diluter dilutes the hydrogen included in the anode off-gas that flows from the purge valve 24 with the cathode off-gas.

Cathode System

The cathode system comprises the air pump 31 (or compressor, compressing device, reaction gas supply unit), a humidifier 32, a normal-open type of the back-pressure valve 33 (or reaction gas supply unit), a normal-open type of the circulation valve 34 (or off-gas flow rate control unit, gas supply unit), flow rate sensors 35, 36 and a thermo-sensor 37.

The inlet port of the air pump 31 communicates with the outside of a vehicle (or outside) through a pipe 31a. The discharge port of the air pump 31 is connected to the inlet of the cathode passage 12 through a pipe 31b, the humidifier 32 and a pipe 32a.

Then, after the air pump 31 starts operation following the instructions of the ECU 80, the air pump 31 sucks air outside the vehicle through the pipe 31a and compresses the air. The compressed air is transferred by pressure to the cathode passage 12 through the pipe 31b or the like.

The humidifier 32 comprises a plurality of hollow fiber membranes 32e having moisture permeability. Further, the humidifier 32 humidifies the air flowing toward the cathode passage 12 by using the cathode off-gas having the high humidity discharged from the cathode passage 12, thereby to humidify the air flowing toward the cathode passage 12.

The outlet of the cathode passage is connected to the pipe 32b, the humidifier 32, a pipe 33a, the back-pressure valve 33 and a pipe 33b. Then, the cathode off-gas (or oxidation off-gas) discharged from the cathode passage 12 is discharged to the outside of the vehicle through the pipe 32b or the like.

Note the pipe 33b is equipped with the diluter (not shown).

The back-pressure valve 33 is composed of, for example, a butterfly valve, and controls the air pressure in the cathode passage 12 through regulated the opening thereof by the ECU 80. In detail, when the opening of the back-pressure valve 33 becomes small, the air pressure in the cathode passage 12 increases, resulting in the increase in the oxygen concentration per volume flow rate (or volume concentration). In contrast, when the opening of the back-pressure valve 33 becomes large, the air pressure in the cathode passage 12 decreases, resulting in the decline in the oxygen concentration per volume flow rate (or volume concentration).

The pipe 33b downstream of the diluter is connected to the pipe 31a through the pipe 34a, the circulation valve 34 and the pipe 34b. This connection allows a part of the exhaust gas (or cathode off-gas) to be supplied as a circulation gas to the pipe 31a through the pipe 34a and the pipe 34b, and to be joined with fresh air from the outside of the vehicle, thereby to be sucked by the air pump 31. Note as described hereinbefore, the high humidity of the cathode off-gas flowing as a circulation gas allows the humidifier 32 to be downsized by joining the cathode off-gas to the fresh air.

Accordingly, in the present embodiment, the junction passage that joins the cathode off-gas to the fresh air flowing toward the cathode comprises the pipe 34a and the pipe 34b. Further, the junction passage is equipped with the circulation valve 34.

The circulation valve 34 is composed of, for example, a butterfly valve, and controls the flow rate of the circulation gas flowing toward the pipe 31a through the process that the ECU 80 regulates the opening of the circulation valve 34.

The flow rate sensor 35 is attached to the pipe 31b and detects the air flow rate (g/s) flowing toward the cathode passage 12, thereby to output the data thus detected to the ECU 80.

The flow rate sensor 36 is attached to the pipe 34b and detects the flow rate of the circulation gas (g/s) flowing toward the pipe 31a, thereby to output the data thus detected to the ECU 80.

The thermo-sensor 37 is attached to the pipe 33a and detects the temperature of the cathode off-gas, thereby to output the data thus detected to the ECU 80. Herein, the temperature of the circulation gas is substantially equal to the temperature of the cathode off-gas. Thus, the temperature of the circulation gas may be detected based on the temperature of the cathode off-gas detected by the thermo-sensor 37.

Coolant System

The coolant system comprises a coolant pump 41, and a radiator 42 (or heat sink).

The exhaust port of the coolant pump 41 is connected to the inlet port of the coolant pump 41 through the members in the order of the pipe 41a, the coolant passage 13, the pipe 42a, the radiator 42 and the pipe 42b. Then, when the coolant pump starts the operation following the instructions of the ECU 80, subsequently the coolant circulates between the coolant passage 13 and the radiator 42, thereby to appropriately cool the fuel cell stack 10.

Electric Power Control System

Next, will be explained an electric power control system referring to FIG. 2.

The electric power control system comprised a high voltage system which operates by the electric power at a high voltage and a low voltage system which operates by the electric power at a low voltage (for example, 12V).

The high voltage system comprises the motor 51 (or motor/generator), a PDU (Power Drive Unit) 52, a high voltage battery (or electricity storage unit), an SOC sensor 54, a first convertor 55 (or DC/DC convertor, voltage control unit), an air conditioner 56 for a vehicle (or air conditioning system), and a second convertor 57 (DC/DC convertor).

The motor 51 is an electric motor for traveling, which is to be a power source of a fuel cell vehicle. Further, the motor 51 functions as a generator (or dynamo) at the deceleration of a fuel cell vehicle, to generate regenerative electric power. Furthermore, the motor 51 is connected to the output terminal of the fuel cell stack 10.

The PDU 52 converts the direct current power supplied from the fuel cell stack 10 and/or the high voltage battery into three-phase altering current power, following the instructions of the ECU 80, and supplies the converted power to the motor 51 as an inverter. Further, the PDU 52 supplies the regenerative electric power from the motor 51 to the high voltage battery 53.

The high voltage battery 53 is connected to the portion between the fuel cell stack 10 and the PDU 52 through the first converter 55. That is, the first converter 55 is arranged at the side of the high voltage battery 53, when the first converter 55 is viewed from the connecting point to which the fuel cell stack 10, the motor 51 and the high voltage battery 53 are connected.

The high voltage battery 53 charges excess electric power generated by the fuel cell stack 10, or assists (or compensate) lack of electric power of the fuel cell stack 10. Such a high voltage battery 53 comprises, for example, a battery pack including a plurality of single cells in a lithium ion secondary battery type.

The SOC sensor 54 is a sensor for detecting an SOC (State Of Charge (%)) of the high voltage battery 53, and comprises a voltage sensor and a current sensor. Herein, the SOC sensor 54 outputs the SOC of the high voltage battery 53 to the ECU 80.

The first convertor 55 is controlled by the ECU 80, which is a DC/DC convertor capable of setting the output voltage higher or lower. Further, the appropriate control over the terminal voltage of the first converter 55; the terminal being at the fuel cell stack 10 side, allows the generated electric power (or actual current, actual voltage) of the fuel cell stack 10 to be regulated.

The air pump 31, the coolant pump 41, the air conditioner 56 (or compressor for compressing the coolant), a second convertor 57 and the PDU 52 (or motor 51) are connected in parallel with the fuel cell stack 10 and the high voltage battery 53.

Note the second convertor 57 converts high voltage power from the fuel cell stack 10, the high voltage battery 53, and the motor 51 into low voltage (12V) power following the instruction of the ECU 80, thereby to supply the converted power to the low voltage system.

The low voltage system comprises a low voltage battery 61, the accessory 62 and the ECU 80. Further, the low voltage battery 61 (or 12V battery), the accessory 62 and the ECU 80 are connected to the second convertor 57 in parallel.

The low voltage battery 61 is a power source of the accessory 62 and the ECU 80. Further, the SOC (%) of the low voltage battery 61 is detected by an SOC sensor (not shown) and the SOC is outputted to the ECU 80. Further, the low voltage battery 61 appropriately stores electricity from the second convertor 57.

The accessory 62 includes, for example, head lights or a room light.

Next, returning to FIG. 1, the explanation of the embodiment will be continuously described.

An IG 71 is an activation switch of the fuel cell system 1 (or fuel cell vehicle), and arranged around a driver's sheet. Further, the IG 71 outputs an ON/OFF signal thereof to the ECU 80.

An accelerator 72 is a stepping pedal used by a driver to accelerate the fuel cell vehicle, and arranged at the feet of the driver's seat. Further, the accelerator 72 outputs the accelerator opening (or accelerator stepping amount) to the ECU 80.

ECU

The ECU 80 is a control device for electronically controlling the fuel cell system 1, comprising a CPU, a ROM, a RAM, various interfaces, and an electronic circuit or the like. Herein, following the programs stored inside the ECU 80, the ECU functions various types of operations, to control various types of devices such as the air pump 31, the back-pressure valve 33 and the circulation valve 34 or the like.

ECU-Mode Switching/Operation Function

The ECU 80 has a function for switching a first mode of the fuel cell system 1 and a second mode thereof based on the target voltage and the switching voltage (0.8V) of the single cell, thereby to operate the fuel cell system 1.

The first mode is an operational mode of having the actual voltage outputted from the single cell correspond to the target voltage, when the target voltage of the single cell is equal to or less than the switching voltage.

The second mode is an operational mode of having the actual voltage outputted from the single cell correspond to the required voltage, by changing the amount of the air supply (or oxygen concentration), along with maintaining the actual voltage of the single cell at the switching voltage, when the target voltage of the single cell is higher than the switching voltage.

ECU-Power Generation Stability Judgment Function

The ECU 80 (or power generation stability judgment unit) has a function of judging the power generation stability, which determines whether or not the power generation of the fuel cell stack 10 is performed stably.

More specifically, the ECU 80 is configured to judge that the power generation of the fuel cell stack 10 is performed unstably, if the minimum cell voltage inputted from the cell voltage monitor 14 is lower than a voltage that is calculated by subtracting the predetermined voltage from the average cell voltage (that is, "minimum cell voltage"<"average cell voltage−predetermined voltage"). Note the predetermined voltage is appropriately set according to the pre-trial tests or the like.

Operation of Fuel Cell System

Next, the operation of the fuel cell system 1 will be explained, referring to FIGS. 6 to 17.

Basic Operation

Figure 6:
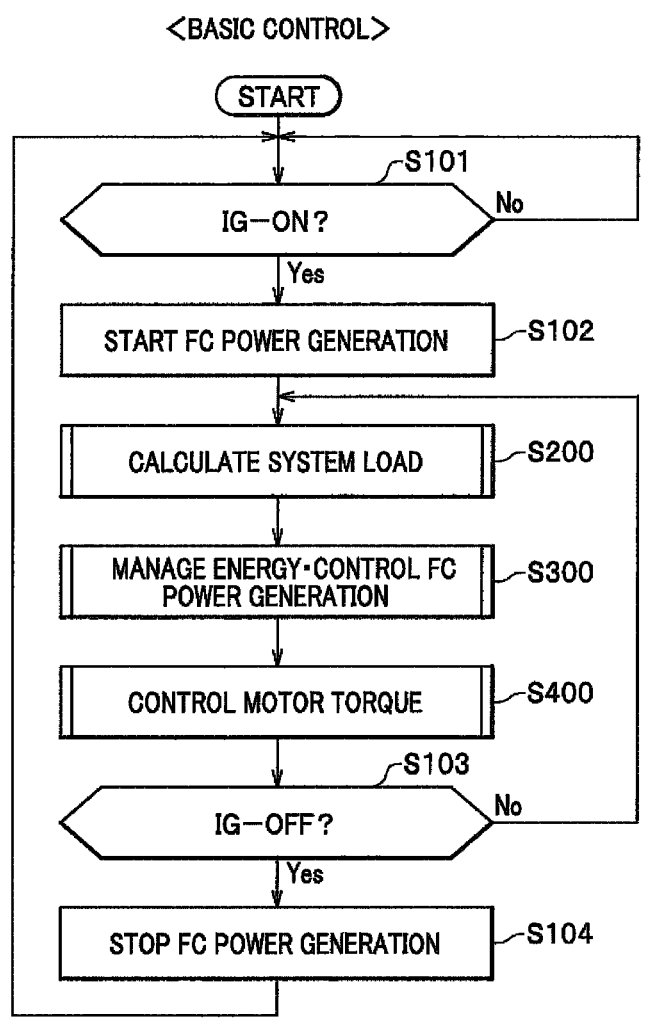
FIG. 6 is a main flow chart of the fuel cell system in the present embodiment.

Referring to FIG. 6, basic operation of the fuel cell system 1 will be explained.

In the step S101, the ECU 80 judges whether or not the IG71 is turned on.

When the ECU 80 judges that the IG 71 is turned on (or S101=Yes), the process of the ECU 80 proceeds to the step S102. On the other hand, when the ECU 80 judges that the IG 71 is not turned on (or S101=No), the ECU 80 repeatedly judges the step S101.

In the step S102, the ECU 80 executes a power generation start process of the fuel cell stack 10.

More specifically, the ECU 80 opens a shut-off valve (not shown) equipped with the pipe 21a to supply hydrogen to the anode passage 11, and also supplies air to the cathode passage 12 activating the air pump 31. Further, the ECU 80 activates the coolant pump 41 thereby to circulate the coolant.

In the step S200, the ECU 80 executes a system load calculation process for calculating the system load (or estimated power consumed by system) required by the whole system load such as the motor 51 and the accessory 62. More specific examples will be explained hereinafter.

In the step S300, the ECU 80 executes an energy management process of the whole fuel cell system 1 and a power generation control process of the fuel cell stack 10. More specific examples will be explained hereinafter.

In the step S400, the ECU 80 executes a motor torque control process for controlling the output torque of the motor 51. More specific examples will be explained hereinafter.

In the step S103, the ECU 80 judges whether or not the IG71 is turned off. If the ECU 80 judges that the IG 71 is turned off (or S103=Yes), the process of the ECU 80 proceeds to the step S104. On the other hand, if the ECU 80 judges that the IG 71 is not turned off (or S103=No), the process of the ECU 80 proceeds to the step S200.

In the step S104, the ECU 80 executes a power generation stop process.

More specifically, the ECU 80 closes the shut-off valve (not shown) equipped with the pipe 21a to shut-off the hydrogen flow, and stops the air pump 31 and the coolant pump 41, thereby to stop the power generation of the fuel cell stack 10.

After that, the process of the ECU 80 proceeds to the step S101.

System Load Calculation Process

Figure 7:
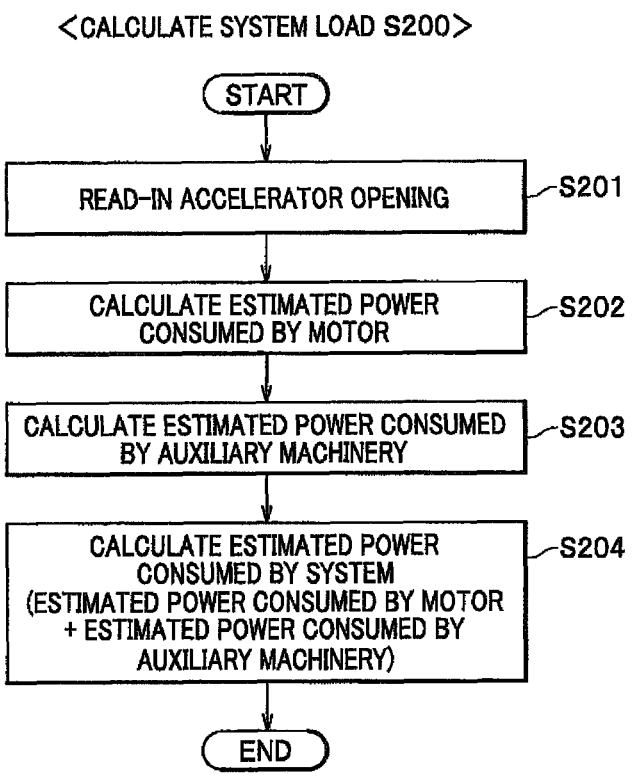
FIG. 7 is a sub-flow chart of the system load calculation process S200 shown in FIG. 6.

Next, referring to FIG. 7, a system load calculation process S200 will be explained.

In the step S201, the ECU 80 reads in the present opening of the accelerator of 72 (or accelerator opening degree).

Figure 10:
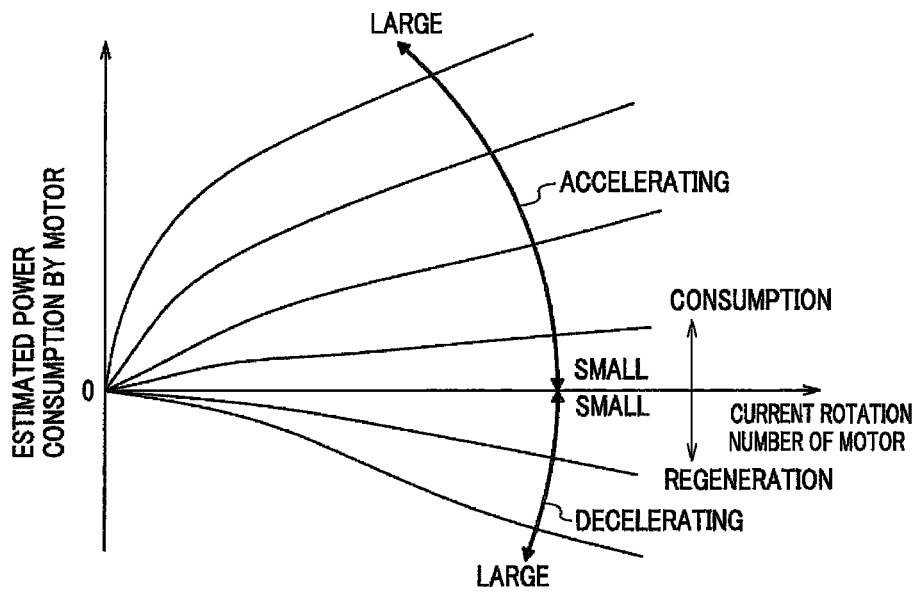
FIG. 10 is a mapping diagram showing the relationship among the rotation number of a motor, the state of the fuel cell (that is, accelerating/decelerating), and the estimated power consumption by the motor.

In the step S202, the ECU 80 calculates the estimated power consumed by the motor 51 from now on, based on the present rotation number (rpm, or rotation speed) of the motor 51, the degree of the acceleration or deceleration of a fuel cell vehicle, and the map data in FIG. 10. Herein, the map in FIG. 10 is created by pre-trial tests or simulations, and stored in the ECU 80 beforehand. The degree of acceleration or deceleration is calculated based on the accelerator opening (or variation thereof), and the change in the speed of the fuel cell vehicle, detected by a vehicle speed sensor (not shown). The present rotation number of the motor 51 is detected by a rotation number sensor (not shown) or the like attached to the output shaft of the motor 51.

Herein, in FIG. 10, when the estimated power consumption by the motor is "plus", this shows that the motor 51 is estimated to consume the electric power, while when the estimated power consumption by the motor is "minus", this indicates that the motor 51 is to generate regenerative electric power.

As shown in FIG. 10, when the fuel cell vehicle is accelerating, the more the present rotation number of the motor 51 increases, or the larger the degree of the deceleration is, the larger the estimated power consumption by the motor becomes to the plus side.

In contrast, when the vehicle is decelerating, the more the present rotation number of the motor 51 decreases and the more the deceleration degree increases, the larger the estimated power consumption by the motor becomes toward the minus side (that is, the regenerative electric power becomes larger).

In the step S203, the ECU 80 calculates the estimated power consumed by the auxiliary machinery after that.

Figure 2:
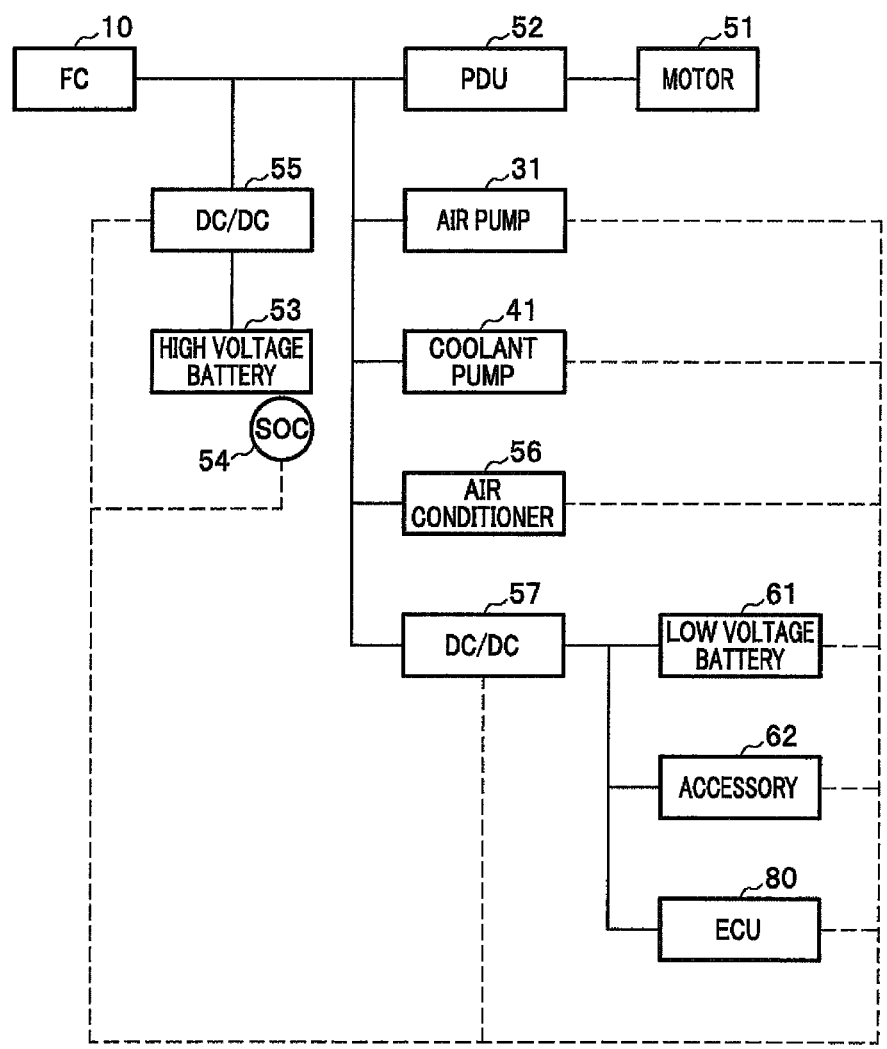
FIG. 2 is a diagram showing a schematic construction of the electric power control system of the fuel cell system in the present embodiment.

Here, the auxiliary machinery is categorized into two types: the auxiliary machinery of the high voltage system such as the air pump 31, the coolant pump 41 and the air conditioner 56, and the auxiliary machinery of the low voltage system such as the low voltage battery 61 and the accessory 62 (see FIG. 2). Therefore, the estimated power consumed by the auxiliary machinery is calculated by adding the estimated power consumed by the auxiliary machinery in the high voltage system and the estimated power consumed by the auxiliary machinery in the low voltage system (see the equation (5) as shown below).

"Estimated Power Consumed By Auxiliary Machinery"="Estimated Power Consumed By Auxiliary Machinery In High Voltage System"+"Estimated Power Consumed By Auxiliary Machinery In Low Voltage System" (5)

Here, the electric power consumed in the previous step S306 (see FIG. 8) is used as the estimated power consumed by the air pump 31.

Further, the estimated electric power consumed in the previous step S306 (see FIG. 8) is used as the estimated power consumed by the coolant pump 41.

Moreover, the estimated power consumed by the air conditioner 56 is calculated based on the data (for example, air flow=large, medium, or low or the like) of an operational panel (not shown) that operates the air conditioner 56.

The estimated power consumed by the low voltage battery 61 is calculated based on the present SOC transmitted from the SOC sensor attached to the low voltage battery 61. For example, if the present SOC is smaller than the target SOC, the estimated power consumed by the low voltage battery 61 is calculated as a value at the plus side corresponding to the charging side.

The estimated power consumed by the accessory 62 is calculated based on an operational state of the accessory 62 (for example, ON/OFF state of the head lights or the like).

In the step S204, the ECU 80 calculates the whole estimated power consumed by the fuel cell system 1 (or estimated power consumed by system, required electric power) after that. The estimated power consumed by the system is calculated by adding the estimated power consumed by the motor calculated in the step S202 and the estimated power consumed by the auxiliary machinery calculated in the step S203 (see the equation (6) as shown below).

"Estimated power consumed by System"="Estimated Power Consumed By Motor"+"Estimated Power Consumed By Auxiliary Machinery" (6)

Then, the process of the ECU 80 proceeds to the step S300 in FIG. 6 through the step of "END".

Energy Management Process/Power Generation Control Process of Fuel Cell Stack S300

Figure 8:
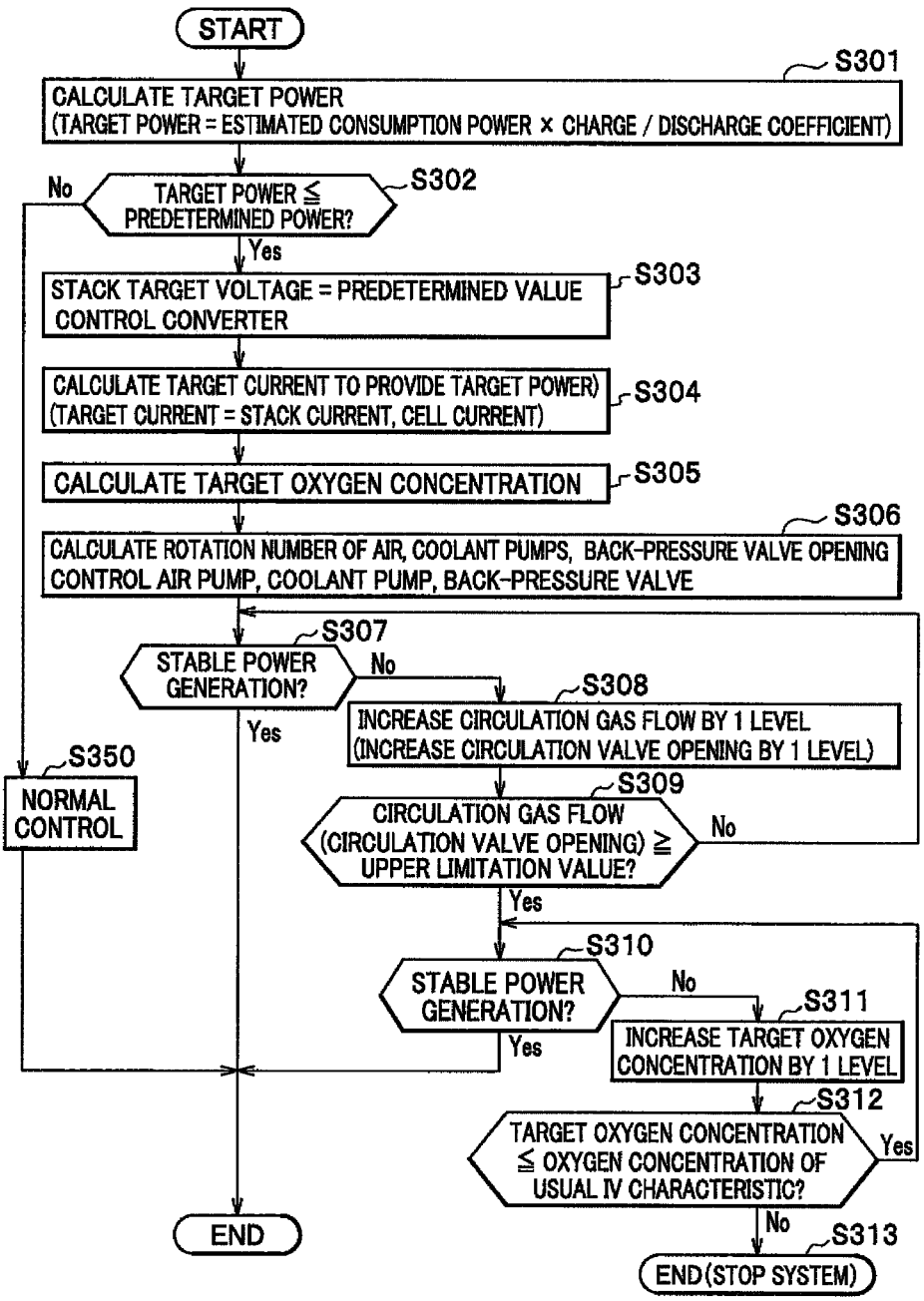
FIG. 8 is a sub-flow chart of the power generation control process S300 of the energy management/fuel cell stack shown in FIG. 6.

Next, referring to FIG. 8, the energy management process/the power generation control process of the fuel cell stack 10 S300 will be explained.

Note in the initiation state, the opening of the circulation valve 34 is substantially 0° (full closed state) and the flow rate (g/s) of the circulation gas is substantially 0.

In the step S301, the ECU 80 calculates target electric power (or required electric power) which should be outputted by the fuel cell stack 10. The target electric power is calculated by multiplying the estimated consumption power of the system calculated in the step S204 by the charge/discharge coefficient of the battery 53 (see the equation (7) as describe below).

"Target Electric Power"="Estimated Consumption Power OF System"×"Charge/Discharge Coefficient" (7)

Figure 11:
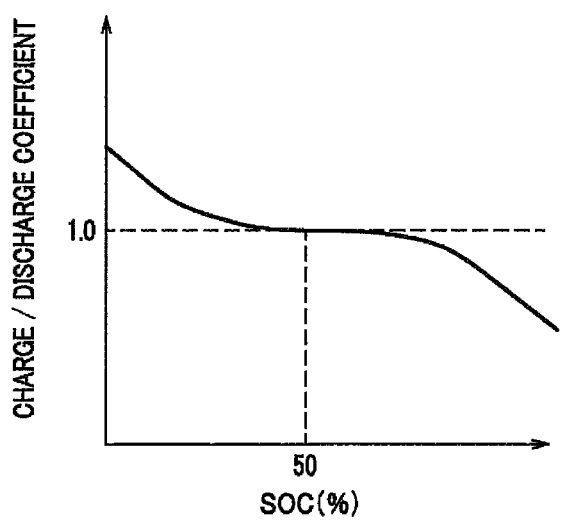
FIG. 11 is a mapping diagram showing the relationship between an SOC (State Of Charge) of a high voltage battery and a charge/discharge coefficient.

The charge/discharge coefficient of the battery 53 is calculated based on the present SOC inputted from the SOC sensor 54 and the map data shown in FIG. 11. Herein, the map data in FIG. 11 is created by pre-trial tests or the like, and stored in the ECU 80 beforehand. Here, a case is shown as an example that the target SOC (or target storage volume) of the battery 53 is 50(%). However, this is not limited to the example and various cases may be performed.

As shown in FIG. 11, in the region where the SOC is smaller than 50(%), the electric power generation of the fuel cell stack 10 becomes excess, and thereby the charge/discharge coefficient tends to become larger than the value of "1" such that the excess electric power is stored in the high voltage battery 53.

In contrast, in the region where the SOC is larger than 50(%), the electric power generation of the fuel cell stack 10 becomes deficient, and thereby the charge/discharge coefficient tends to become smaller than the value of "1" such that the deficient electric power is compensated by discharging the high voltage battery 53.

In the step S302, the ECU 80 judges whether or not the target electric power calculated in the step S301 is equal to or less than the predetermined power.

The predetermined power is a fixed value calculated by multiplying the following three values: "the cell voltage judged that the catalyst is not damaged (or 0.8V, switching voltage, predetermined voltage)", "the number of the single cells composing the fuel cell stack 10", and "the current value in the case that the cell voltage is set at 0.8V in the normal IV characteristics (or IV curve, see FIG. 15) of the fuel cell stack 10" (see the equation (8) as described below).

"Predetermined Power"="0.8V (or Switching Voltage, Predetermined Voltage)"×"Number of Single Cells"×"Current Value of Normal IV Characteristics" (8)

In the step S302, if the ECU 80 judges that the target electric power is equal to or less than the predetermined electric power (S302=Yes), the process of the ECU 80 proceeds to the step S303. In contrast, if the ECU 80 judges that the target electric power is more than the predetermined electric power (S302=No), the process of the ECU 80 proceeds to the step S350.

Note, in the present embodiment, if the ECU 80 judges that the target electric power is equal to or less than the predetermined electric power (or the power consuming load being at a lower side), it follows that the target voltage of the single cell is more than the switching voltage (0.8V), and then the second mode will be executed.

On the other hand, if the ECU 80 judges that the target electric power is more than the predetermined electric power, it follows that the target voltage of the single cell is equal to or less than the switching voltage (0.8V), and then the first mode will be executed.

Second Mode

In the step S303, the ECU 80 sets the target voltage of the whole fuel cell stack 10 (or stack target voltage) to a predetermined value. The predetermined value is calculated by multiplying the "the cell voltage (or 0.8V) judged as the value that the catalyst is not damaged" by "the number of the single cells composing the fuel cell stack 10" (see the equation (9) as shown below.

"Predetermined Value"="0.8V (or Switching Voltage, Predetermined Voltage)"×"Number of Single Cells" (9)

Then, the ECU 80 controls the first converter 55 such that the target voltage of the whole fuel cell stack 10 is set (or kept) to the predetermined value. More specifically, the voltage of the first converter 55 at the side of the fuel cell stack 10 is set to the predetermined value.

This allows the actual voltage of the single cell to be equal to or lower than the cell voltage judged that the catalyst is not damaged (or 0.8V). Therefore, theses advantages prevent the oxidation and the reduction reactions of the catalyst from being frequently repeated in the same period (see FIG. 3), resulting in the difficulty in the deterioration (or elution) of the catalyst (see FIG. 4).

In the step S304, the ECU 80 calculates a target current which corresponds to the target power calculated in the step S301. Herein, the target current is calculated by dividing the target electric power calculated in the step S301 by the stack target voltage (or predetermined value) calculated in the step S303 (see the equation shown below). This allows the target current to correspond to the target electric power.

Here, the fuel cell stack 10 is configured by connecting a plurality of the single cells in series. Hereby, the target current becomes equal to the current passing through the whole fuel cell stack 10 (or stack current), and to the current passing through each single cell.

"Target Current"="Target Electric Power"/"Predetermined Value" (10)

Figure 12:
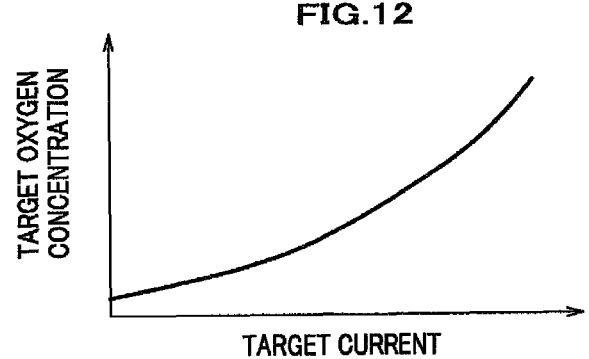
FIG. 12 is a mapping diagram showing the relationship between the target current and the target oxygen concentration.

In the step S305, the ECU 80 calculates the target oxygen concentration (or oxygen concentration per unit volume flow rate) of air circulating in the cathode passage 12, based on the target current calculated in the step S304 and the map data in FIG. 12.

Note the map in FIG. 12 is created by pre-trial tests or the like, and stored in the ECU 80 beforehand. Further, as shown in FIG. 12, there is a relationship between the target current and the target oxygen concentration that the smaller the target current is, the lower the target oxygen concentration is. This relationship allows the target oxygen concentration to correspond to the target current (or target electric power).

Figure 13:
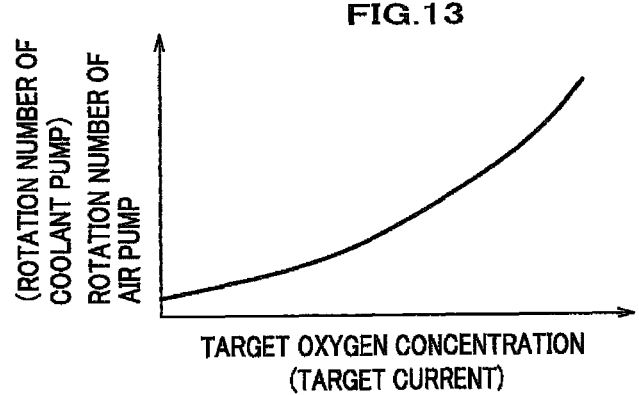
FIG. 13 is a mapping diagram showing the relationship between the target oxygen concentration (or target current) and the rotation number (rotation speed) of an air pump (or coolant pump).
Figure 14:
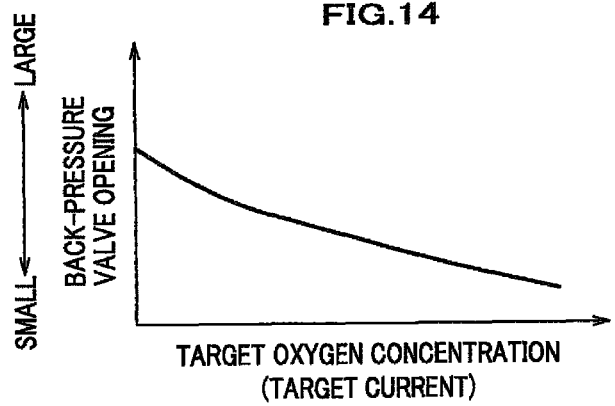
FIG. 14 is a mapping diagram showing the relationship between the target oxygen concentration (or target current) and the opening of a back-pressure valve.

In the step S306, the ECU 80 respectively calculates the target rotation number of the air pump 31, the target rotation number of the coolant pump 41, and the target opening of the back-pressure valve 33 based on the target oxygen concentration (or target current) calculated in the step S305 and the map data in FIGS. 13 and 14.

Note the maps in FIGS. 13 and 14 are created in the pre-trial tests or the like, and the data thereof are stored in the ECU 80 beforehand. Further, the lower the target oxygen concentration is, the fewer the rotation number of the air pump 31 and the rotation number of the coolant pump 41 become, while the larger the target opening of the back-pressure valve 33 is.

Then, the ECU 80 controls the air pump 31 and the coolant pump 41 such that each rotation number becomes the target rotation number calculated as mentioned before. Further, the ECU 80 has the back-pressure valve 33 opened to the target opening. These operations allow the supply amount of the coolant to the fuel cell stack 10 to correspond to the target oxygen concentration (or target current, target electric power).

Then, as shown in FIG. 15, along with fixing the cell voltage of the single cell at 0.8V, the cell current (or the current of the fuel cell stack 10) changes in accordance with the target oxygen concentration. Hereby, the actual voltage outputted from the fuel cell stack 10 turns to be the target electric power calculated in the step S301.

In other words, although the voltage of the fuel cell stack 10 is more or less fixed at the predetermined value, the actual current of the fuel cell stack 10 is changed, whereby the actual electric power of the fuel cell stack 10 may correspond to the target electric power calculated in the step S301.

Note after the ECU 80 has controlled the units as mentioned above, the ECU 80 detects a flow rate (g/s) of air circulating in the cathode passage 12 via the flow rate sensor 35, and a pressure of air circulating in the cathode passage 12 via the pressure sensor (not shown). Then, preferably, the ECU 80 feed-back controls the rotation number of the air pump 31, the rotation number of the coolant pump 41, and the opening of the back-pressure valve 33, based on the detected flow rate and pressure.

In the step S307, the ECU 80 judges whether or not the electric power generation by the fuel cell stack 10 is stably performed.

If the ECU 80 judges that the electric power generation by the fuel cell stack 10 is stably performed (that is, S307=Yes), the process of the ECU 80 proceeds to the step S400 shown in FIG. 6, through the step of "END". In contrast, if the ECU 80 judges that the electric power generation by the fuel cell stack 10 is not stably (or unstably) performed (that is, S307=No), the process of the ECU 80 proceeds to the step S308.

Figure 16:
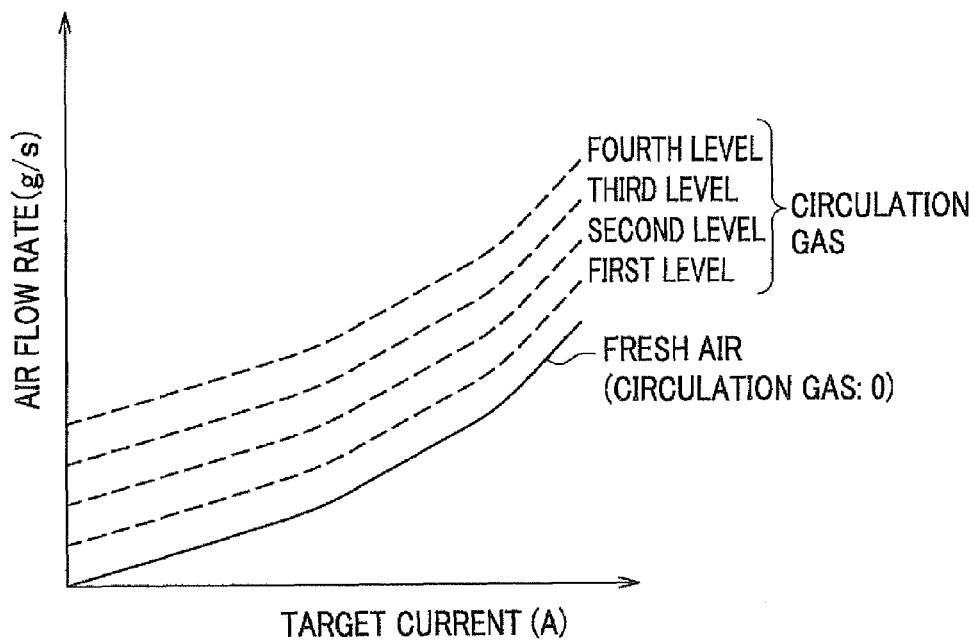
FIG. 16 is a mapping diagram showing the relationship between the target current and the air flow rate.

In the step S308, the ECU 80 increases the flow rate of the circulation gas by one level through widening the opening of the circulation valve 34, while monitoring the flow rate (g/s) of the circulation gas via the flow rate sensor 36 (see FIG. 16).

Note the increased amount of the circulation gas at each level is appropriately set. As shown in FIG. 16, when the circulation valve 34 is fully opened, the flow rate of the circulation gas increases up to the fourth level, showing an exemplary case of the maximum flow rate thereof.

Then, a rate of amounts of the circulation gas to amounts of the intake gas sucked by the air pump 31 is increased. That is, the rate between the fresh air (or air sucked from the outside of a vehicle) and the circulation gas, changes such that the rate of the circulation gas is increased, with respect to the sucked intake gas. Herein, the oxygen concentration of the circulation gas (or cathode off-gas) is lower than the oxygen concentration of the fresh air. Hereby, if the rotation number of the air pump 31 and the opening of the back-pressure valve 33 are the same before/after the circulation valve 34 controls the flow rate of the circulation gas, the oxygen concentration of the circulating gas in the cathode passage 12 may turn to be lowered.

Therefore, preferably, the rotation number of the air pump 31 is increased, and/or the opening of the back-pressure valve 33 is decreased along with the increase in the flow rate of the circulation gas, so as to keep the target oxygen concentration calculated in the step S305, before/after the flow rate control of the circulation gas in the step S308.

That is, for example, if the flow rate of the circulation gas is increased, preferably the flow rate of the fresh air is also increased by increasing the rotation number of the air pump 31. Then, the above mentioned procedure may facilitate the total flow rate of the gas (or mixed gas of fresh air and circulation gas) flowing toward the cathode passage 12 to be increased, and the oxygen distribution capacity to all the single cells to be improved, thereby to easily recover the power generation performance of the fuel cell stack 10.

As mentioned hereinbefore, the circulation gas is joined to the fresh air along with keeping the target oxygen concentration, to increase the volume flow rate (L/s) of the gas circulating in the cathode passage 12. This facilitates the gas of which volume flow rate is increased along with keeping the target oxygen concentration, to be easily spread all over the cathode passage 112 that is complicatedly formed in the fuel cell stack 10. Accordingly, the joined gas is easily supplied similarly to each single cell, thereby tending to easily resolve the unstable electric power generation of the fuel cell stack 10. Further, water drops (or condensed water or the like) adhering to a surface of the MEA and a wall surrounding the cathode passage 12 tends to be easily removed.

In the step S309, the ECU 80 judges whether or not the flow rate of the circulation gas detected through the flow rate sensor 36 is equal to or more than the upper limit value. The upper limit value to be an acceptance criterion is set to the value that the opening of the circulation valve 34 becomes fully opened.

In such a case, even if the opening of the circulation valve 34 is constant, when the rotation number of the air pump 31 increases, the flow rate of the circulation gas detected by the flow rate sensor 36 is increased. Accordingly, preferably the upper limit value is set associated with the rotation number of the air pump 31 such that the upper limit value becomes larger as the rotation number of the air pump 31 increases.

Here, when the ECU judges that the flow rate of the circulation gas is equal to or more than the upper limit value (S309=Yes), the process of the ECU 80 proceeds to a step S310. In contrast, when the ECU judges that the flow rate of the circulation gas is less than the upper limit value (S309=No), the process of the ECU 80 proceeds to a step S307.

Herein, in the steps S308 and S309, the process of the ECU 80 is conducted based on the flow rate of the circulation gas. Alternatively, the process of the ECU 80 may be conducted based on the opening of the circulation valve 34. That is, in the step S308, the opening of the circulation valve 34 may be set such that the opening of the circulation valve 34 is increased in one level (for example, 30°) in the open direction. Then, in the step S309, if the circulation valve is fully opened (S309=Yes), the process of the ECU 80 may proceed to the step S310.

Figure 17:
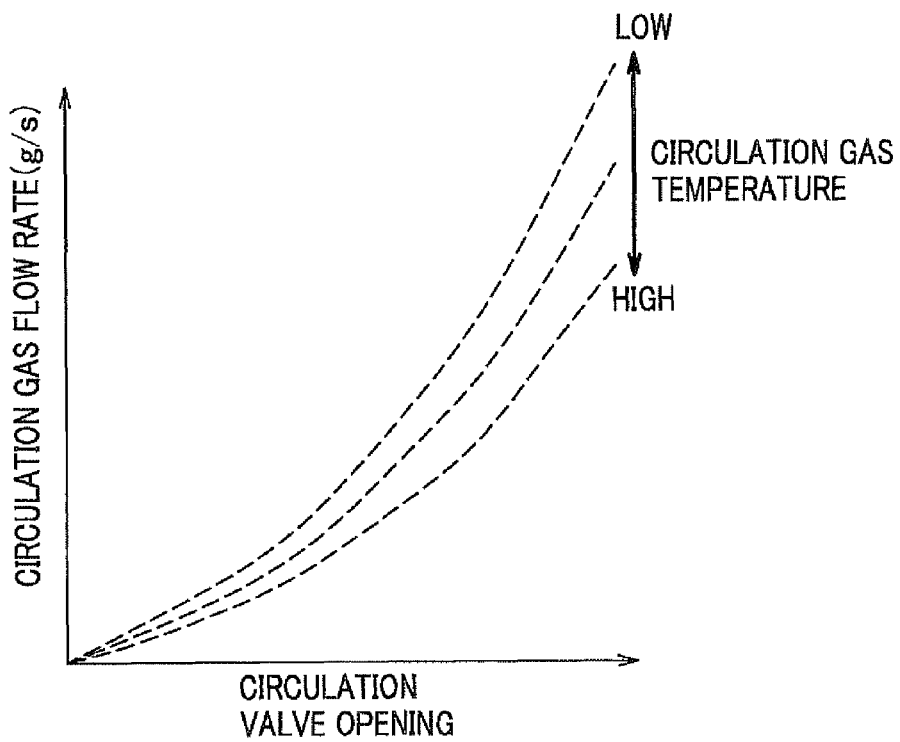
FIG. 17 is a mapping diagram showing the relationship between the opening of a circulation valve and the flow rate of a circulation gas.

Further, in such a case, the flow rate (g/s) may be calculated based on the opening of the circulation valve 34, the temperature of the circulation gas, and the map data in FIG. 17. As shown in FIG. 17, the higher the temperature of the circulation gas becomes, the smaller the density thereof becomes, and the less flow rate thereof (g/s) becomes.

Returning to FIG. 8, the explanation of the embodiment will be continued.

In the step S310, the ECU 80 judges whether or not the electric power generation of the fuel cell stack 10 is stably performed, similarly to the step S307.

If the ECU 80 judges that the electric power generation of the fuel cell stack 10 is performed stably (S310=Yes), the process of the ECU 80 proceeds to a step S400 shown in FIG. 6 through the step of "END". In contrast, if the ECU 80 judges that the electric power generation of the fuel cell stack 10 is performed unstably (S310=No), the process of the ECU 80 proceeds to the step S311.

In the step S311, the ECU80 increases the target oxygen concentration calculated in the step S305 by one level, and executes the increase in the rotation number of the air pump 31, and/or the decrease in the opening of the back-pressure valve 33. Herein, the opening degree increased in the one level of the target oxygen concentration may be appropriately set based on the results of the pre-trial tests or the like.

In the step S312, the ECU 80 judges whether or not the present oxygen concentration (or increased target oxygen concentration in the step S311) is equal to or less than the target oxygen concentration in the normal IV characteristics. Herein, the target oxygen concentration in the normal IV characteristics means an oxygen concentration corresponding to the target current in the case that the cell voltage is set to 0.8V, with respect to the IV characteristics (or IV curve) of the fuel cell stack 10 normally generating electric power by being supplied with the abundant amounts of hydrogen and air (or oxygen) in just proportions (see FIG. 15).

If the ECU 80 judges that the present oxygen concentration is equal to or less than the target oxygen concentration in the normal IV characteristics (S312=Yes), the process of the ECU 80 proceeds to the step 310. In contrast, if the ECU 80 judges that the present oxygen concentration is more than the target oxygen concentration in the normal IV characteristics (S312=No), the process of the ECU 80 proceeds to the step 313.

In the step S313, the ECU 80 stops the fuel cell system 1. That is, the ECU 80 stops the supply of hydrogen and air to the fuel cell stack 10, thereby to stop the electric power generation of the fuel cell stack 10. Then, preferably the ECU 80 turns on (or activates) an alarm lamp (or communication unit), thereby to notify to the operator that the fuel cell stack 10 is anomalous. Moreover, preferably the ECU 80 supplies the electric power to the motor 51 (or PDU 52) from the high voltage battery 53, so as to have the fuel cell vehicle go on travelling.

Normal Control

Next, will be explained a step 350 to which the process of the ECU 80 proceeds, when the judgment in the step 302 is "No".

In the step S350, the ECU 80 normally has the fuel cell system 1 normally generate electric power by the fuel cell stack 10 following the normal IV characteristics. That is, the ECU 80 changes the actual current and the actual voltage of the fuel cell stack 10 such that the target electric power calculated in the step S301 is outputted, while supplying abundant amounts of hydrogen and air to the fuel cell stack 10 in just proportions (see FIG. 15).

Then, the process of the ECU 80 proceeds to the step S400 in FIG. 6 through the process of "END".

Motor Torque Control

Figure 9:
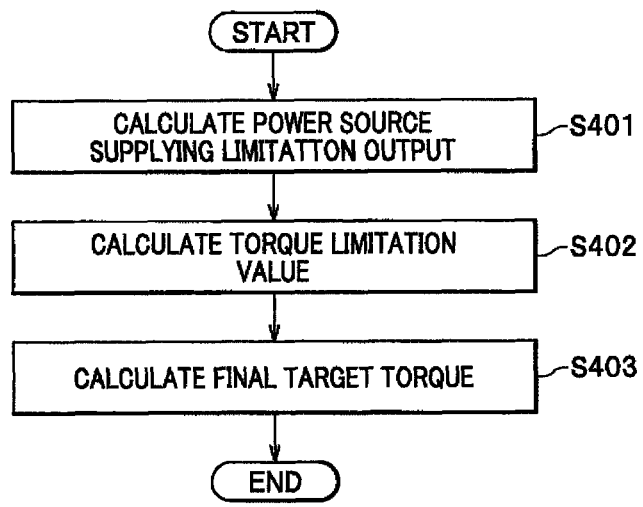
FIG. 9 is a sub-flow chart of the motor torque control process S400 shown in FIG. 6.

Next, the motor torque control process S400 will be explained, referring to FIG. 9.

In the step S401, the ECU 80 calculates a power source supplying limitation output (W). The power source supplying limitation output is obtained by subtracting "the electric power consumed by the auxiliary machinery" from the value calculated by adding "the present output (actual electric power) of the fuel cell stack 10" and "the limitation output of the high voltage battery 53" (referred to the equation (11)).

"Power Source Supplying Limitation Output"="FC Stack Output"+"High Voltage Battery Limitation Output"−"Electric Power Consumed by Auxiliary Machinery"  (11)

The limitation output of the high voltage battery 53 is a fixed value determined based on the specification thereof (or rated value or the like). Herein, the value calculated in the step S203 is applied to the electric power consumed by the auxiliary machinery.

In the step S402, the ECU 80 calculates a torque limitation value of the motor 51. The torque limitation value is calculated by dividing "the power source supplying limitation output" by "present vehicle speed of the fuel cell vehicle (referred to the equation (12)). Note the speed of the fuel cell vehicle is detected by a vehicle speed sensor (not shown).

"Torque Limitation Value"="Power Source Supplying Limitation Output"/"Vehicle Speed"  (12)

In the step S403, the ECU 80 calculates final target torque of the motor 51.

More specifically, the ECU 80 calculates target torque by map searching based on the accelerator opening or the like, and restricts the target torque to the torque limitation value calculated in the step S402, thereby to calculate the final target torque.

Then, the ECU 80 controls the PDU 52 such that the final target torque is generated by the motor 51.

After that, the process of the ECU 80 proceeds to the step S103 shown in FIG. 6 through the step of "END".

Effect of Fuel Cell System

According to the aforementioned fuel cell system 1, the following effects will be obtained.

If the target electric power is more than the predetermined electric power (S302=No), that is, if the target voltage of the single cell is less than the switching voltage (0.8V), the fuel cell stack is operated in the first mode, and the actual electric power of the fuel cell stack 10 corresponds to the target electric power (S350). This allows the fuel cell stack 10 to prevent the generated power from being larger or smaller than the demanded power. Accordingly, the frequency of the charge/discharge process in the high voltage battery 53 becomes fewer, resulting in the decrease in the electric energy loss.

In contrast, if the target electric power is equal to or less than the predetermined electric power (S302=Yes), that is, if the target voltage of the single cell is more than the switching voltage (0.8V), the actual voltage of the fuel cell stack is fixed at the predetermined value (S303), that is the actual voltage of the single cell is fixed at the switching voltage (0.8V). This allows the elution or the like of the catalyst to be suppressed, the deterioration of the fuel cell stack 10 to be suppressed, and the durability of the fuel cell stack 10 to be improved.

Further, the modification of the actual current of the fuel cell stack 10 (S304, S305, and S306) enables the actual electric power of the fuel cell stack 10 to correspond to the target electric power, by changing the oxygen concentration through controlling the air pump 31 or the like to change the IV characteristics of the fuel cell stack 10. This allows the frequency of the charge/discharge process in the high voltage battery 53 to be decreased, thereby to decrease the electric energy loss.

The calculation of the target electric power based on the target SOC (50%) of the battery 53 (S301) enables the frequency of the charge/discharge process in the high voltage battery 53 to be decreased, thereby to preferably maintain the SOC of the high voltage battery 53.

If the electric power generation by the fuel cell stack 10 is unstable (S307=No), the circulation gas is made to increase (S308), which facilitates the electric power generation of the fuel cell stack 10 to be performed stably.

Operational Example of Fuel Cell System

Next, an operational example of the fuel cell system 1 will be explained referring to FIG. 18.

As shown in FIG. 18, if the system consumption power (or target electric power) is equal to or less than the predetermined power (S302=Yes) and the fuel cell system 1 is operated in the first mode, the fuel stack current (or actual current) corresponds to the system consumption power, and the actual electric power of the fuel cell stack 10 also corresponds to the system consumption power, even though the actual voltage of the fuel cell stack 10 (or single cell) is constant (S303). Further, the electric power consumed by the air pump 31 and the coolant pump 41 corresponds to the system consumption power.

Moreover, when the system consumption power increases, the high voltage battery 53 is discharged, thereby to decrease the SOC thereof. In contrast, when the system consumption power decreases, the high voltage battery 53 is charged, thereby to increase the SOC thereof.

Modification Example

As mentioned hereinbefore, the embodiment of the present invention has been explained. However, the present invention is not limited to the embodiment, and for example, the following modifications may be performed.

According to the aforementioned embodiment, as shown in FIG. 2, the construction is exemplarily shown, in which the first convertor 55 is arranged at the high voltage battery side 53, when the construction is viewed from the junction point of the fuel cell stack 10, the motor 51, and the high voltage battery 53. However, in other embodiments, the constructions in FIGS. 19A to 19C may be applied.

Figure 19A:
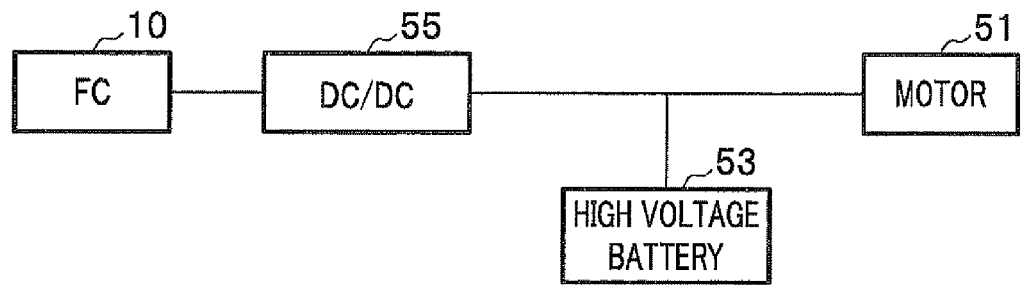
FIGS. 19A-19C are diagrams each showing a schematic construction of the electric power control system of the fuel cell system in a modified example.

That is, as shown in FIG. 19A, the first convertor 55 may be arranged at the side of the fuel cell stack 10, when the construction is viewed from the junction point.

Figure 19B:
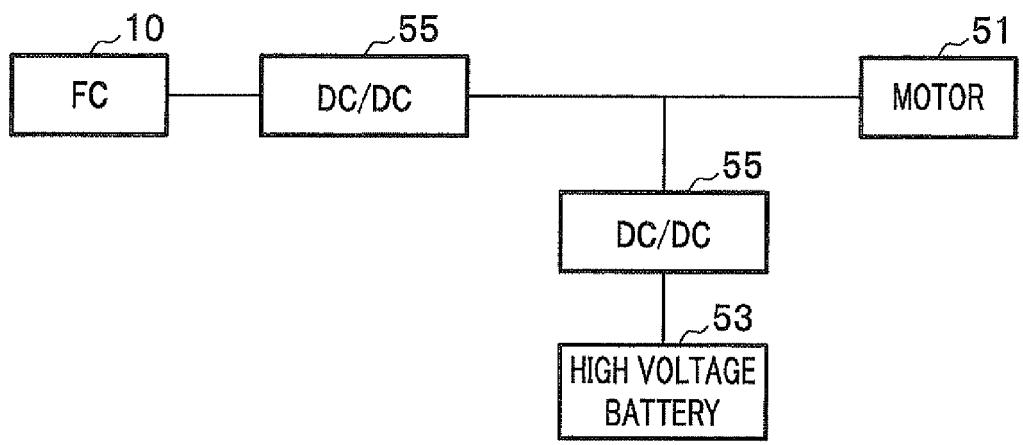

Further, as shown in FIG. 19B, the first convertors 55 may be arranged at the side of the fuel cell stack 10 and at the side of the high voltage battery 53, respectively, when the construction is viewed from the junction point.

Figure 19C:
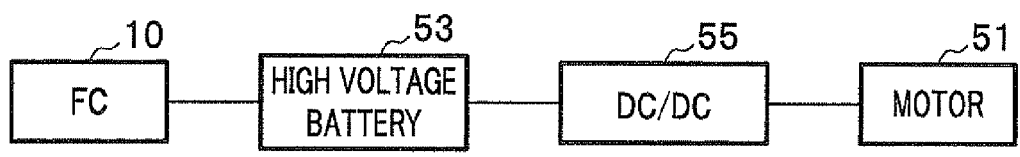

Alternatively, as shown in FIG. 19C, the fuel cell stack 10 and the high voltage battery 53 may be connected in series, and the first convertor 55 may be arranged between the high voltage battery 53 and the motor 51.

In the aforementioned embodiment, the construction having the air pump 31 that supplies air containing oxygen to the fuel cell stack 10 has been exemplarily shown. However, the construction having a hydrogen pump that supplies hydrogen to the fuel cell stack 10 may be desirable, with replacing the air pump 31 by or further adding the hydrogen pump to the construction.

According to the aforementioned embodiment, in the cathode system, the construction including the junction passage (or pipes 34a and 34b) that joins the cathode off-gas to fresh air, and the circulation valve 34 has been exemplarily shown. However, with replacing by or added to the above mentioned construction in the cathode system, the anode system may be similarly configured to the cathode system. For example, a circulation valve (or off-gas flow rate control unit, gas supply unit) may be provided with the pipe 23b, and the flow rate of the anode off-gas joined to fresh hydrogen may be controlled by the circulation valve.

According to the aforementioned embodiment, the construction in which the predetermined voltage is set at 0.8V equal to or less than the voltage range where the oxidation-reduction reaction proceeds (that is, 0.8V-0.9V). However, the predetermined voltage may be out of the voltage range where the oxidation-reduction reaction proceeds. More specifically, in another construction, the predetermined voltage may be equal to or more than the voltage range where the oxidation-reduction reaction proceeds. Thus, the predetermined voltage may be 0.9V or more in such a construction.

In the aforementioned embodiment, the example that the fuel cell system 1 is mounted on the fuel cell vehicle has been explained. However, various constructional examples of other moving bodies such as a motorcycle, a train and a ship or the like may be included. Further, the present invention may be applied to a stationary fuel cell system for home use, or a fuel cell system integrated in a hot water supply system.

What is claimed is:

1. A fuel cell system comprising:
    a fuel cell comprising a catalyst and generating electric power by promoting a reaction of hydrogen or oxygen by the catalyst;
    a gas supply unit for supplying at least either of oxygen and hydrogen to the fuel cell;
    a coolant supply unit for supplying a coolant to the fuel cell;
    a voltage control unit for controlling a voltage outputted from the fuel cell;
    a power consuming load driven by the electric power outputted from the fuel cell; and
    a control unit for controlling the gas supply unit, the coolant supply unit and the voltage control unit, wherein
    the control unit is configured to control the gas supply unit and the voltage control unit, based on a target voltage of the fuel cell calculated on the basis of required electric power and a switching voltage equal to or less than a voltage range where an oxidation-reduction reaction of the catalyst proceeds;
    the control unit executes a first mode of controlling the voltage control unit such that an actual voltage of the fuel cell corresponds to the target voltage, if the target voltage is equal to or less than the switching voltage; and
    the control unit executes a second mode of having actual electric power outputted from the fuel cell correspond to the required electric power by controlling the voltage control unit such that the actual voltage of the fuel cell is kept at the switching voltage, along with changing an actual current of the fuel cell through changing at least either of oxygen and hydrogen concentrations through controlling the gas supply unit to modify IV characteristics of the fuel cell, if the target voltage is more than the switching voltage.

2. The fuel cell system as described in claim 1, wherein the switching voltage is set based on the IV characteristics of the fuel cell which normally generates electric power by circulation of abundant reaction gases.

3. The fuel cell system as described in claim 1, further comprising an electricity storage unit for storing electricity generated by the fuel cell.

4. The fuel cell system as described in claim 3, wherein the control unit calculates the required electric power based on electricity storage volume stored in the electricity storage unit, such that the electricity storage unit stores target electricity storage volume.

5. The fuel cell system as described in claim 1, wherein
    the control unit fixes the actual voltage of the fuel cell at the predetermined voltage, and controls the coolant supply unit such that a supply amount of the coolant to the fuel cell corresponds to the required electric power, while the control unit has at least either of the oxygen and hydrogen concentrations correspond to the required electric power demanded by the power consuming load.

6. The fuel cell system as described in claim 1, further comprising a power generation stability judgment unit for judging whether or not the fuel cell stably generates electric power, wherein
    the control unit controls the gas supply unit such that at least either of the oxygen and hydrogen concentrations increases, if the power generation stability judgment unit judges that the fuel cell does not stably generate the electric power.

7. The fuel cell system as described in claim 6, further comprising a junction passage for joining an off-gas of at least either of the oxygen and hydrogen, discharged from the fuel cell, to at least either of the oxygen and the hydrogen flowing toward the fuel cell, wherein
    the gas supply unit includes an off-gas flow rate control unit for controlling a flow rate of the off-gas to be joined; the off-gas flow rate control unit being arranged at the junction passage; and
    the off-gas flow rate control unit increases the flow rate of the off-gas, if the power generation stability judgment unit judges that the fuel cell does not stably generate the electric power.

8. The fuel cell system as described in claim 7, wherein
    the control unit controls the gas supply unit such that at least either of concentrations of fresh oxygen and hydrogen introduced from the outside increases, after the off-gas flow rate control unit increases the flow rate of the off-gas, if the power generation stability judgment unit judges that the fuel cell does not stably generate the electric power.

9. The fuel cell system as described in claim 1, wherein the gas supply unit comprises an air pump for supplying air containing oxygen to the fuel cell.

10. The fuel cell system as described in claim 1, wherein the gas supply unit comprises a hydrogen pump for supplying hydrogen to the fuel cell.

11. The fuel cell system as described in claim 1, wherein the power consuming load comprises a motor for driving a vehicle, and is mounted on the vehicle.

* * * * *